United States Patent
Yanai et al.

(10) Patent No.: US 10,663,827 B2
(45) Date of Patent: May 26, 2020

(54) TRANSPARENT SCREEN COMPRISING A PLURALITY OF DOT ARRAYS HAVING DIFFERENT SELECTIVE REFLECTIVE WAVELENGTHS, THE PLURALITY OF DOT ARRAYS OBTAINED BY IMMOBILIZING A CHOLESTERIC LIQUID CRYSTALLINE PHASE

(71) Applicant: FUJIFILM Corporation, Tokyo (JP)

(72) Inventors: Yujiro Yanai, Minami-ashigara (JP); Akira Yamamoto, Minami-ashigara (JP); Michio Nagai, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/169,638

(22) Filed: Oct. 24, 2018

(65) Prior Publication Data

US 2019/0064411 A1 Feb. 28, 2019

Related U.S. Application Data

(63) Continuation of application No. PCT/JP2017/016206, filed on Apr. 24, 2017.

(30) Foreign Application Priority Data

Apr. 25, 2016 (JP) ................................. 2016-087011

(51) Int. Cl.
*G02F 1/137* (2006.01)
*G03B 21/604* (2014.01)
(Continued)

(52) U.S. Cl.
CPC ....... *G02F 1/13718* (2013.01); *G02B 5/3016* (2013.01); *G02F 1/13* (2013.01);
(Continued)

(58) Field of Classification Search
CPC ............... G03B 21/604; G02F 1/13718; G02F 2201/343; G02F 2203/05;
(Continued)

(56) References Cited

U.S. PATENT DOCUMENTS

| 2004/0252373 A1* | 12/2004 | Umeya ................ | G02B 5/3016 |
| | | | 359/449 |
| 2005/0122583 A1* | 6/2005 | Umeya .................. | G03B 21/56 |
| | | | 359/449 |

(Continued)

FOREIGN PATENT DOCUMENTS

| JP | 5-107660 A | 4/1993 |
| JP | 2005-156690 A | 6/2005 |

(Continued)

OTHER PUBLICATIONS

International Preliminary Report on Patentability and Written Opinion of the International Searching Authority (Form PCT/IB/326, PCT/IB/373 and PCT/ISA/237) for International Application No. PCT/JP2017/016206, dated Nov. 8, 2018, with English translation.
International Search Report (Form PCT/ISA/210) for International Application No. PCT/JP2017/016206, dated Jul. 18, 2017, with English translation.
Japanese Office Action for Japanese Application No. 2018-514583, dated Sep. 10, 2019, with an English translation.

*Primary Examiner* — Paul C Lee
(74) *Attorney, Agent, or Firm* — Birch, Stewart, Kolasch & Birch, LLP

(57) ABSTRACT

An object is to provide: a transparent screen having high transparency in which a hot spot caused by transmitted light can be reduced; and an image display system in which visibility of a screen is excellent and a hot spot is reduced by using the transparent screen. The object is achieved by the transparent screen including: a dot array in which dots obtained by immobilizing a cholesteric liquid crystalline phase are two-dimensionally arranged; and a layer that is obtained by immobilizing a cholesteric liquid crystalline phase.

9 Claims, 5 Drawing Sheets

(51) Int. Cl.
  *G03B 21/62* (2014.01)
  *G02B 5/30* (2006.01)
  *G02F 1/13* (2006.01)
  *G09G 3/36* (2006.01)
  *H04N 9/31* (2006.01)
  *G02F 1/1335* (2006.01)

(52) U.S. Cl.
  CPC .......... *G03B 21/604* (2013.01); *G03B 21/62* (2013.01); *G09G 3/36* (2013.01); *H04N 9/31* (2013.01); *G02F 2001/13756* (2013.01); *G02F 2001/133543* (2013.01); *G02F 2201/343* (2013.01); *G02F 2203/05* (2013.01); *G09G 2300/0486* (2013.01)

(58) Field of Classification Search
  CPC .......... G02F 2001/133543; G02F 2001/13756; G09G 2300/0486
  See application file for complete search history.

(56) References Cited

U.S. PATENT DOCUMENTS

| 2006/0181771 | A1* | 8/2006 | Taira | G02B 27/28 359/487.02 |
| 2008/0182041 | A1* | 7/2008 | Sekine | G02B 5/3016 428/29 |
| 2009/0015548 | A1* | 1/2009 | Tazaki | G06F 3/0308 345/156 |

FOREIGN PATENT DOCUMENTS

| JP | 2014-71250 A | | 4/2014 |
| JP | 2014071250 A | * | 4/2014 |
| WO | WO 2015/125908 A1 | | 8/2015 |

* cited by examiner

TRANSPARENT SCREEN COMPRISING A PLURALITY OF DOT ARRAYS HAVING DIFFERENT SELECTIVE REFLECTIVE WAVELENGTHS, THE PLURALITY OF DOT ARRAYS OBTAINED BY IMMOBILIZING A CHOLESTERIC LIQUID CRYSTALLINE PHASE

CROSS-REFERENCE TO RELATED APPLICATIONS

This application is a Continuation of PCT International Application No. PCT/JP2017/016206 filed on Apr. 24, 2017, which claims priority under 35 U.S.C. § 119(a) to Japanese Patent Application No. 2016-087011 filed on Apr. 25, 2016. The above application is hereby expressly incorporated by reference, in its entirety, into the present application.

BACKGROUND OF THE INVENTION

1. Field of the Invention

The present invention relates to a transparent screen and an image display system including this transparent screen.

2. Description of the Related Art

Recently, as a screen constituting a projection type display device, a transparent screen that diffuses and/or reflects projection light projected from a projector to display an image and allows transmission of light from front and back surfaces is known.

For example, JP1993-107660A (JP-H5-107660A) describes a projection type liquid crystal projection system including a transparent screen in which a cholesteric liquid crystal that reflects red light, green light, and blue light of right or left circularly polarized light is used. In the projection type liquid crystal projection, transmission of a right or left circularly polarized light component of external light emitted to the transparent screen is allowed by polarizing red light, green light, and blue light projected to the transparent screen into right or left circularly polarized light using a $\lambda/4$ plate.

SUMMARY OF THE INVENTION

However, in a case where an image is displayed using a projector, there is a problem in that a hot spot occurs. For example, in the image display system including the transparent screen described in JP1993-107660A (JP-H5-107660A), the hot spot refers to a phenomenon in which a light source of a projector is observed on a side of the transparent screen opposite to the projector in a straight advancing direction of outgoing light of the projector. In a case where a hot spot occurs due to transmitted light having transmitted through the transparent screen, the hot spot appears glaring in case of being observed from the side of the transparent screen opposite to the projector.

In the transparent screen described in JP1993-107660A (JP-H5-107660A), in a case where the transparency of the screen is high, a hot spot is significantly glaring. In particular, in a laser projector in which a transparent screen is used and a laser is used as a light source, a hot spot is extremely glaring.

In a typical opaque screen, specularly reflected light in a straight advancing direction of outgoing light of a projector causes a hot spot to occur. In the opaque screen, an uneven structure is imparted to the outermost surface of the screen to diffuse light such that a hot spot caused by specularly reflected light is reduced.

However, in the transparent screen described in JP1993-107660A (JP-H5-107660A), in a case where the uneven structure is imparted to the outermost surface, the transparency significantly deteriorates, and thus a countermeasure thereagainst cannot be used.

That is, in an image display system including a transparent screen, it is desired to develop a transparent screen in which high transparency is secured and a hot spot caused by transmitted light is reduced.

An object of the present invention is to solve the above-described problem of the related art and to provide a transparent screen having high transparency in which a hot spot caused by transmitted light can be reduced, and an image display system including the transparent screen.

In order to achieve the object, according to the present invention, there is provided a transparent screen comprising: a dot array in which dots obtained by immobilizing a cholesteric liquid crystalline phase are two-dimensionally arranged; and a layer that is obtained by immobilizing a cholesteric liquid crystalline phase.

In the transparent screen according to the present invention, it is preferable that a selective reflection wavelength of the dots is equal to a selective reflection wavelength of the layer.

It is preferable that a rotation direction of circularly polarized light reflected from the dots is the same as a rotation direction of circularly polarized light reflected from the layer.

In addition, it is preferable that a plurality of the dot arrays are provided, selective reflection wavelengths of the dot arrays are different from each other, a plurality of the layers are provided, and selective reflection wavelengths of the layers are different from each other.

In addition, it is preferable that the dot arrays include a dot array that reflects red light, a dot array that reflects green light, and a dot array that reflects blue light, and the layers include a layer that reflects red light, a layer that reflects green light, and a layer that reflects blue light.

In addition, it is preferable that the dot arrays include a dot array that reflects right circularly polarized light and a dot array that reflects left circularly polarized light, and the layers include a layer that reflects right circularly polarized light and a layer that reflects left circularly polarized light.

It is preferable that the transparent screen further comprises a $\lambda/4$ plate.

In addition, a first aspect of an image display system according to the present invention provides an image display system comprising: the transparent screen according to the present invention; and a projector of which outgoing light is unpolarized light.

Further, a second aspect of an image display system according to the present invention provides an image display system comprising: the transparent screen according to the present invention that comprises the $\lambda/4$ plate; and a projector of which outgoing light is linearly polarized light.

In the image display system according to the present invention, it is preferable that the dot array is positioned between the layer and the projector, and in the dot array, convex portions of the dots face the projector.

According to the present invention, it is possible to realize: a transparent screen having high transparency in which a hot spot caused by transmitted light can be reduced;

and an image display system including the transparent screen in which a hot spot caused by transmitted light is reduced.

DESCRIPTION OF THE PREFERRED EMBODIMENTS

Figure 1:
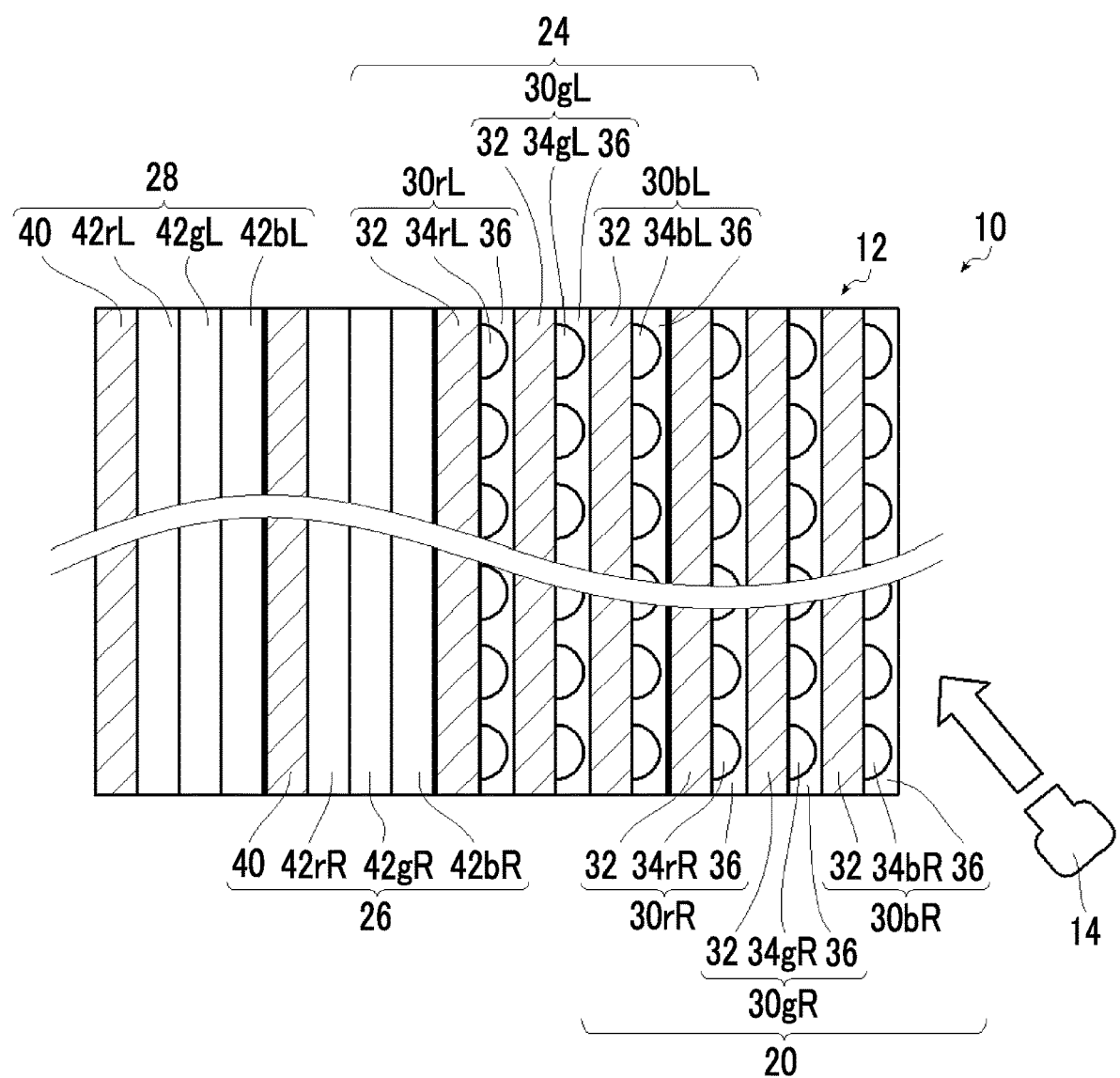
FIG. 1 is a diagram conceptually showing an example of an image display system according to an embodiment of the present invention.

Hereinafter, a transparent screen and an image display system according to the present invention will be described in detail based on a preferable embodiment shown in the accompanying drawings.

In this specification, numerical ranges represented by "to" include numerical values before and after "to" as lower limit values and upper limit values.

In this specification, for example, unless specified otherwise, an angle such as "45°", "parallel", "perpendicular", or "orthogonal" represents that a difference from an exact angle is less than 5°. The difference from an exact angle is preferably less than 4° and more preferably less than 3°.

In this specification, "(meth)acrylate" represents "either or both of acrylate and methacrylate".

In this specification, the meaning of "the same" includes a case where an error range is generally allowable in the technical field. In addition, in this specification, the meaning of "all", "entire", or "entire surface" includes not only 100% but also a case where an error range is generally allowable in the technical field, for example, 99% or more, 95% or more, or 90% or more.

In this specification, visible light refers to light which can be observed by human eyes among electromagnetic waves and refers to light in a wavelength range of 380 to 780 nm Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

In this specification, retroreflection refers to reflection in which incident light is reflected in an incidence direction.

In this specification, "haze" refers to a value measured using a haze meter NDH-2000 (manufactured by Nippon Denshoku Industries Co., Ltd.).

Theoretically, haze refers to a value expressed by the following expression.

(Diffuse Transmittance of Natural Light at 380 to 780 nm)/(Diffuse Transmittance of Natural Light at 380 to 780 nm+Direct Transmittance of Natural Light)×100%

The diffuse transmittance refers to a value calculated by subtracting the direct transmittance from a total transmittance which is obtained using a spectrophotometer and an integrating sphere unit. The direct transmittance refers to a transmittance at 0° in a case where a value measured using an integrating sphere unit is used. That is, low haze represents that the amount of directly transmitted light in the total amount of transmitted light is large.

In this specification, Re ($\lambda$) and Rth ($\lambda$) represent an in-plane retardation and a thickness-direction retardation at a wavelength of $\lambda$, respectively. Unless specified otherwise, the wavelength $\lambda$ refers to 550 nm.

In this specification, Re ($\lambda$) and Rth ($\lambda$) are values measured at the wavelength $\lambda$ using AxoScan OPMF-1 (manufactured by Opto Science Inc.). By inputting an average refractive index (($N_x+N_y+N_z$)/3)) and a thickness (d ($\mu$m) to AxoScan, the following expressions can be calculated.

Slow Axis Direction (°)

$$Re(\lambda)=R0(\lambda)$$

$$Rth(\lambda)=((N_x+N_y)/2-N_z)\times d$$

R0 ($\lambda$) is expressed as a numerical value calculated by AxoScan and represents Re ($\lambda$).

In this specification, the refractive indices $N_x$, $N_y$, and $N_z$ are measured using an Abbe refractometer (NAR-4T, manufactured by Atago Co., Ltd.), and a sodium lamp ($\lambda$=589 nm) is used as a light source. In addition, the wavelength dependence can be measured using a combination of a multi-wavelength Abbe refractometer DR-M2 (manufactured by Atago Co., Ltd.) and an interference filter.

In addition, as the refractive index, values described in "Polymer Handbook" (John Wiley&Sons, Inc.) and catalogs of various optical films can also be used. The values of average refractive index of major optical films are as follows: cellulose acylate (1.48), cycloolefin polymer (1.52), polycarbonate (1.59), polymethyl methacrylate (1.49), and polystyrene (1.59).

In this specification, a selective reflection wavelength refers to an average value of two wavelengths at which, in a case where a minimum value of a transmittance of a target object (member) is represented by Tmin (%), a half value transmittance: T½(%) represented by the following expression is exhibited.

Expression for obtaining Half Value Transmittance: T½=100−(100−Tmin)÷2

In addition, selective reflection wavelengths of a plurality of objects being "equal" does not represent that the selective reflection wavelengths are exactly equal, and error is allowed in a range where there are no optical effects. Specifically, selective reflection wavelengths of a plurality of objects being "equal" represents a difference between the selective reflection wavelengths of the respective objects is 20 nm or less, and this difference is preferably 15 nm or less and more preferably 10 nm or less.

The transparent screen according to the embodiment of the present invention includes: a dot array in which dots obtained by immobilizing a cholesteric liquid crystalline phase are two-dimensionally arranged; and a layer that is obtained by immobilizing a cholesteric liquid crystalline phase. In addition, the image display system according to the embodiment of the present invention includes: the transparent screen according to the embodiment of the present invention; and a projector of which outgoing light is polarized light or unpolarized light.

FIG. 1 conceptually shows an example of the image display system according to the embodiment of the present invention including an example of the transparent screen according to the embodiment of the present invention.

An image display system 10 shown in FIG. 1 includes: a transparent screen 12 according to the embodiment of the present invention; and a projector 14 of which outgoing light is unpolarized light.

In the image display system 10, the transparent screen 12 has a configuration in which a right polarized light dot film 20, a left polarized light dot film 24, a right polarized light reflecting layer film 26, and a left polarized light reflecting layer film 28 are laminated. In order to clearly show the configuration of the transparent screen 12, a support 32 and a support 40 shown below are indicated by oblique lines. In addition, an interface between the right polarized light dot film 20 and the left polarized light dot film 24, an interface between the left polarized light dot film 24 and the right polarized light reflecting layer film 26, and an interface between the right polarized light reflecting layer film 26 and the left polarized light reflecting layer film 28 are indicated by thick lines.

In the following description, unless specified otherwise, the same shall be applied not only to the transparent screen of the image display system 10 shown in FIG. 1 but also to various transparent screens according to the embodiment of the present invention used in various image display systems according to the embodiment of the present invention described below.

In addition, although not shown in the drawings, the right polarized light dot film 20 and the left polarized light dot film 24, the left polarized light dot film 24 and the right polarized light reflecting layer film 26, and the right polarized light reflecting layer film 26 and the left polarized light reflecting layer film 28 are bonded to each other, respectively, using bonding layers provided therebetween.

In the present invention, as the bonding layer, any bonding layer formed of one of well-known various materials can be used as long as it is a material that can bond a plate-shaped material (sheet-like material) as a target. That is, the bonding layer may be a layer formed of an adhesive or a layer formed of a pressure sensitive adhesive. The adhesive is a material that has fluidity during bonding and becomes a solid after bonding. The pressure sensitive adhesive is a material that is a gel-like (rubber-like) flexible solid during bonding and of which the gel state does not change after bonding. In addition, the bonding layer may be a layer formed of a material having characteristics of both the adhesive and the pressure sensitive adhesive. Accordingly, the bonding layer may be any well-known layer that is used for bonding a sheet-like material in an optical device or an optical element, for example, an optical clear adhesive (OCA), an optically transparent double-sided tape, or an ultraviolet curable resin.

Alternatively, instead of bonding the layers using the bonding layers, the right polarized light dot film 20, the left polarized light dot film 24, the right polarized light reflecting layer film 26, the left polarized light reflecting layer film 28 may be laminated and held by a frame, a holding device, or the like to configure the transparent screen according to the present invention.

The right polarized light dot film 20 includes a red right circularly polarized light dot laminate 30rR, a green right circularly polarized light dot laminate 30gR, and a blue right circularly polarized light dot laminate 30bR.

The red right circularly polarized light dot laminate 30rR includes: the support 32; red right circularly polarized light reflecting dots 34rR that are two-dimensionally arranged on one surface of the support 32; and an overcoat layer 36 that embeds the red right circularly polarized light reflecting dots 34rR and is laminated on the support 32.

The green right circularly polarized light dot laminate 30gR includes: the support 32; green right circularly polarized light reflecting dots 34gR that are two-dimensionally arranged on one surface of the support 32; and the overcoat layer 36 that embeds the green right circularly polarized light reflecting dots 34gR and is laminated on the support 32.

The blue right circularly polarized light dot laminate 30bR includes: the support 32; blue right circularly polarized light reflecting dots 34bR that are two-dimensionally arranged on one surface of the support 32; and the overcoat layer 36 that embeds the blue right circularly polarized light reflecting dots 34bR and is laminated on the support 32.

On the other hand, the left polarized light dot film 24 includes a red left circularly polarized light dot laminate 30rL, a green left circularly polarized light dot laminate 30gL, and a blue left circularly polarized light dot laminate 30bL.

The red left circularly polarized light dot laminate 30rL includes: the support 32; red left circularly polarized light reflecting dots 34rL that are two-dimensionally arranged on one surface of the support 32; and the overcoat layer 36 that embeds the red left circularly polarized light reflecting dots 34rL and is laminated on the support 32.

The green left circularly polarized light dot laminate 30gL includes: the support 32; green left circularly polarized light reflecting dots 34gL that are two-dimensionally arranged on one surface of the support 32; and the overcoat layer 36 that embeds the green left circularly polarized light reflecting dots 34gL and is laminated on the support 32.

The blue left circularly polarized light dot laminate 30bL includes: the support 32; blue left circularly polarized light reflecting dots 34bL that are two-dimensionally arranged on one surface of the support 32; and the overcoat layer 36 that embeds the blue left circularly polarized light reflecting dots 34bL and is laminated on the support 32.

Hereinafter, the components of each of the reflecting dot laminates constituting each of the dot films will be described.

In the following description, in a case where it is not necessary to distinguish the red right circularly polarized light dot laminate 30rR, the green right circularly polarized light dot laminate 30gR, the blue right circularly polarized light dot laminate 30bR, the red left circularly polarized light dot laminate 30rL, the green left circularly polarized light dot laminate 30gL, and the blue left circularly polarized light dot laminate 30bL from each other, these laminates will also be collectively referred to as "dot laminates".

In addition, in the following description, in a case where it is not necessary to distinguish the red right circularly polarized light reflecting dots 34rR, the green right circularly polarized light reflecting dots 34gR, the blue right circularly polarized light reflecting dots 34bR, the red left circularly polarized light reflecting dots 34rL, the green left circularly polarized light reflecting dots 34gL, and the blue left circularly polarized light reflecting dots 34bL from each other, these reflecting dots will also be referred to as "reflecting dots".

<Support>

The supports 32 included in the dot laminates of the right polarized light dot film 20 and the left polarized light dot film 24 support the reflecting dots that are dots obtained by immobilizing a cholesteric liquid crystalline phase described below.

It is preferable that the reflectivity of the support 32 is low at a wavelength where the reflecting dots reflect light, and it is preferable that the support 32 does not include a material which reflects light at a wavelength where the reflecting dots reflect light.

In addition, it is preferable that the support 32 is transparent in a visible range. In addition, the support 32 may be colored. However, it is preferable that the support is not colored or the area of the support colored is small. Further, the refractive index of the support 32 is preferably about 1.2 to 2.0 and more preferably about 1.4 to 1.8.

"Transparent" described in this specification represents that the non-polarized light transmittance (total transmittance) at a wavelength of 380 to 780 nm is preferably 50% or higher, more preferably 70% or higher, and still more preferably 85% or higher.

In addition, a haze value of the support 32 is preferably 30% or lower, more preferably 0.1% to 25%, and still more preferably 0.1% to 10%. Further, by using the support 32 having a high haze such as an antiglare (AG) support, the haze value can be adjusted such that transparency deteriorates and front brightness and viewing angle characteristics are improved.

The thickness of the support 32 may be selected depending on the application without any particular limitation, and is preferably about 5 to 1000 more preferably 10 to 250 μm, and still more preferably 15 to 150 μm.

The support 32 may have a single-layer structure or a multi-layer structure. In a case where the support 32 has a single-layer structure, examples thereof include supports formed of glass, triacetyl cellulose (TAC), polyethylene terephthalate (PET), polycarbonates, polyvinyl chloride, acryl, polyolefin, and the like. In a case where the support 32 has a multi-layer structure, examples thereof include a support including: one of the above-described supports having a single-layer structure that is provided as a substrate; and another layer that is provided on a surface of the substrate.

An underlayer may be provided between the support 32 and the reflecting dots described below. The underlayer is preferably a resin layer and more preferably a transparent resin layer. Examples of the underlayer include a layer for adjusting the shape of the reflecting dot during the formation of the reflecting dot, a layer for improving adhesion properties between the support 32 and the reflecting dots, and an aligned film for adjusting the orientation of a polymerizable liquid crystal compound during the formation of the reflecting dot.

In addition, it is preferable that the reflectivity of the underlayer is low at a wavelength where the reflecting dots reflect light, and it is preferable that the underlayer does not include a material which reflects light at a wavelength where the reflecting dots reflect light. In addition, it is preferable that the underlayer is transparent. Further, the refractive index of the underlayer is preferably about 1.2 to 2.0 and more preferably about 1.4 to 1.8. It is also preferable that the underlayer is a layer including a resin obtained by curing a composition including a polymerizable compound which is directly applied to a surface of the support. Examples of the polymerizable compound include a non-liquid crystal compound such as a (meth)acrylate monomer or a urethane monomer.

The thickness of the underlayer is not particularly limited and is preferably 0.01 to 50 and more preferably 0.05 to 20 μm.

<Reflecting Dots>

In the right polarized light dot film 20, the red right circularly polarized light reflecting dots 34$r$R of the red right circularly polarized light dot laminate 30$r$R are dots that reflect red right circularly polarized light and allow transmission of the other light components. In addition, the green right circularly polarized light reflecting dots 34$g$R of the green right circularly polarized light dot laminate 30$g$R are dots that reflect green right circularly polarized light and allow transmission of the other light components. Further, the blue right circularly polarized light reflecting dots 34$b$R of the blue right circularly polarized light dot laminate 30$b$R are dots that reflect blue right circularly polarized light and allow transmission of the other light components. That is, these reflecting dots have different selective reflection wavelengths.

On the other hand, in the left polarized light dot film 24, the red left circularly polarized light reflecting dots 34$r$L of the red left circularly polarized light dot laminate 30$r$L are dots that reflect red left circularly polarized light and allow transmission of the other light components. In addition, the green left circularly polarized light reflecting dots 34$g$L of the green left circularly polarized light dot laminate 30$g$L are dots that reflect green left circularly polarized light and allow transmission of the other light components. Further, the blue left circularly polarized light reflecting dots 34$b$L of the blue left circularly polarized light dot laminate 30$b$L are dots that reflect blue left circularly polarized light and allow transmission of the other light components. That is, these reflecting dots have different selective reflection wavelengths.

The reflecting dots are dots obtained by immobilizing a cholesteric liquid crystalline phase. That is, the reflecting dots are dots formed of a liquid crystal material having a cholesteric structure.

Here, the cholesteric liquid crystalline phase forming each of the reflecting dots has a stripe pattern including bright portions and dark portions in a cross-section of the reflecting dot in case of being observed with a scanning electron microscope. The reflecting dot includes a portion having a height which continuously increases to a maximum height in a direction moving from an end portion of the reflecting dot to the center of the reflecting dot. In this portion, an angle between a normal line perpendicular to a line, which is formed using a first dark portion from a surface of the reflecting dot opposite to the support 32, and the surface of the reflecting dot is preferably in a range of 70° to 90°.

This point will be described below.

In each of the dot laminates, the reflecting dots may be arranged regularly or irregularly as long as they are two-dimensionally arranged.

In addition, the arrangement density of the reflecting dots in the each of the dot laminates may be uniform over the entire surface, or the dot laminate may have regions having different arrangement densities.

Here, the arrangement density of the reflecting dots in the dot laminate is not particularly limited and may be appropriately set depending on diffusibility (viewing angle), transparency, and the like required for the transparent screen.

For example, from the viewpoint of obtaining high transparency to obtain a wide viewing angle at which a hot spot can be suppressed and the viewpoint of obtaining an appropriate density or the like at which the reflecting dots can be manufactured without defects such as coalescence or deletion of the reflecting dots during manufacturing, in case of being seen from a normal direction perpendicular to a main surface of the support 32, an area ratio of the reflecting dots with respect to the support 32 is preferably 1% to 90.6%, more preferably 2% to 50%, and still more preferably 4 to 30%.

The area ratio of the reflecting dots may be obtained by obtaining an image using a microscope such as a laser microscope, a scanning electron microscope (SEM) or a transmission electron microscope (TEM), measuring area ratios in a region having a size of 1×1 mm, and obtaining an average value of area ratios at, for example, five positions.

Likewise, from the viewpoint of suppressing a hot spot, the viewpoint of obtaining a wide viewing angle, and the viewpoint of obtaining high transparency, a pitch of adjacent reflecting dots is preferably 20 to 500 more preferably 20 to 300 μm, and still more preferably 20 to 150 μm. The pitch of the reflecting dots is the distance between the center of one reflecting dot and the center of another reflecting dot.

In the dot laminate, the diameters and/or shapes of the reflecting dots may be the same as or different from each other and is preferably the same as each other. For example, it is preferable that the reflecting dots are formed under the same conditions for forming the reflecting dots having the same diameter and shape.

In this specification, the description of the reflecting dots is applicable to all the reflecting dots in the transparent screen according to the embodiment of the present invention. Further, it is allowable that the transparent screen according to the embodiment of the present invention including the above-described reflecting dots also includes a dot which deviates from the above description due to an error which is allowable in the technical field.

It is preferable that the reflecting dots (the red right circularly polarized light reflecting dots 34$r$R, the green right circularly polarized light reflecting dots 34$g$R, the blue right circularly polarized light reflecting dots 34$b$R, the red left circularly polarized light reflecting dots 34$r$L, the green left circularly polarized light reflecting dots 34$g$L, and the blue left circularly polarized light reflecting dots 34$b$L) are circular in case of being seen from the normal direction perpendicular to the main surface of the support 32, and the reflecting dots are dots having a shape such as a hemispherical shape (substantially hemispherical shape), a spherical segment shape (substantially spherical segment shape), a spherical trapezoidal shape, a conical shape, or a truncated cone shape. In the following description, the normal direction perpendicular to the main surface of the support 32 will also be referred to as "support normal direction".

The circular shape is not necessarily a perfect circle and may be a substantially circular shape. The center of the reflecting dot described herein refers to the center of the circle or the center of gravity. The reflecting dots are not particularly limited as long as the average shape of the reflecting dots is circular, and may include some reflecting dots having a shape other than a circular shape.

In case of being seen from the support normal direction, an average diameter of the reflecting dots is preferably 10 to 200 μm and more preferably 20 to 120 μm.

The diameter of the reflecting dot can be obtained by measuring the length of a line, which ranges from an end portion (an edge or a boundary of the reflecting dot) to another end portion and passes through the center of the reflecting dot, in an image obtained using a microscope such as a laser microscope, a scanning electron microscope (SEM), or a transmission electron microscope (TEM). The number of reflecting dots and the distance between reflecting dots can be obtained from a microscopic image obtained using a laser microscope, a scanning electron microscope, or a transmission electron microscope.

In a case where a reflecting dot has a shape other than a circular shape in case of being seen from the support normal direction, the diameter (equivalent circle diameter) of a circle having an area equal to the projected area of the reflecting dot is obtained as the diameter of the reflecting dot.

The average diameter is obtained by measuring diameters of 10 selected reflecting dots using the above-described method and obtaining an average value thereof.

The height of the reflecting dot can be obtained from a cross-sectional view of the reflecting dot which is obtained by focal position scanning using a laser microscope or obtained using a microscope such as a SEM or a TEM.

The average maximum height of the reflecting dots is preferably 5 to 30 μm, more preferably 8 to 25 μm, and still more preferably 10 to 20 μm.

<<Optical Characteristics of Reflecting Dots>>

The reflecting dots have wavelength selective reflecting properties. Specifically, the red right circularly polarized light reflecting dots 34$r$R and the red left circularly polarized light reflecting dots 34$r$L reflect red light, the green right circularly polarized light reflecting dots 34$g$R and the green left circularly polarized light reflecting dots 34$g$L reflect green light, and the blue right circularly polarized light reflecting dots 34$b$R and the blue left circularly polarized light reflecting dots 34$b$L reflect blue light.

Basically, the transparent screen 12 according to the embodiment of the present invention is used as a screen that can observe an image which is formed by image light emitted from the projector 14 and a background on a back surface side of the transparent screen 12 in an overlapping manner. It is preferable that light where the reflecting dots exhibit selective reflecting properties is visible light.

Alternatively, it is preferable that the reflection wavelength of the reflecting dots is selected according to a wavelength of light emitted from the projector 14.

As described above, the reflecting dots are dots obtained by immobilizing a cholesteric liquid crystalline phase.

The wavelength of light where the reflecting dots exhibit selective reflecting properties can be adjusted (selected) by adjusting a helical pitch in the cholesteric liquid crystalline phase which forms the reflecting dots.

In addition, in the cholesteric liquid crystalline phase which forms the reflecting dots in the transparent screen according to the embodiment of the present invention, a helical axis direction is adjusted as described below. Therefore, light incident on the reflecting dots includes not only specularly reflected light but also light reflected in various directions.

In addition, the reflecting dots may be colored. However, it is preferable that the reflecting dots are not colored or the area of the reflecting dots colored is small. As a result, the transparency of the transparent screen can be improved.

<<Cholesteric Liquid Crystalline Phase>>

It is known that the cholesteric liquid crystalline phase exhibits selective reflecting properties at a specific wavelength. A center wavelength λ of the selective reflection depends on a pitch P (=helical cycle) of a helical structure in the cholesteric liquid crystalline phase and complies with an average refractive index n of the cholesteric liquid crystalline phase and a relationship of $\lambda = n \times P$. Therefore, the selective reflection wavelength can be adjusted by adjusting the pitch of the helical structure. The pitch of the cholesteric liquid crystalline phase depends on the kind of a chiral agent which is used in combination of a polymerizable liquid crystal compound during the formation of the dot, or the concentration of the chiral agent added. Therefore, a desired pitch can be obtained by adjusting the kind and concentration of the chiral agent.

The details of the adjustment of the pitch can be found in "Fuji Film Research&Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase has a stripe pattern including bright portions and dark portions in a cross-sectional view of the reflecting dot in case of being observed with a scanning electron microscope. Two bright portions and two dark portions in the repeated bright portions and dark portion correspond to one helical pitch. Based on the above fact, the pitch can be measured from the SEM cross-sectional view. In the reflecting dot, a normal line perpendicular to each line of the stripe pattern is the helical axis direction of the cholesteric liquid crystalline phase.

Reflected light of the cholesteric liquid crystalline phase is circularly polarized light. That is, in the transparent screen 12 according to the embodiment of the present invention, the reflecting dots of each of the dot laminates reflect circularly polarized light. Whether or not the reflected light is right circularly polarized light or left circularly polarized light is determined depending on a helical twisting direction of the cholesteric liquid crystalline phase. Regarding the selective reflection of the circularly polarized light by the cholesteric liquid crystalline phase, in a case where the helical twisting direction of the cholesteric liquid crystalline phase is right, right circularly polarized light is reflected, and in a case where the helical twisting direction of the cholesteric liquid crystalline phase is left, left circularly polarized light is reflected.

Accordingly, in the transparent screen 12 shown in the example of the drawing, the reflecting dots of each of the dot laminates of the right polarized light dot film 20 are dots obtained by immobilizing a right-twisted cholesteric liquid crystalline phase, and the reflecting dots of each of the dot laminates of the left polarized light dot film 24 are dots obtained by immobilizing a left-twisted cholesteric liquid crystalline phase. In addition, each of right circularly polarized light reflecting layers described below of the right polarized light reflecting layer film 26 is a layer obtained by immobilizing a right-twisted cholesteric liquid crystalline phase. Further, each of left circularly polarized light reflecting layers of the left polarized light reflecting layer film 28 is a layer obtained by immobilizing a left-twisted cholesteric liquid crystalline phase.

A direction of rotation of the cholesteric liquid crystalline phase can be adjusted by adjusting a kind of a liquid crystal compound for forming the reflecting dots (reflecting layer) and a kind of a chiral agent to be added.

In addition, a full width at half maximum $\Delta\lambda$ (nm) of a selective reflection range (circularly polarized light reflection range) where selective reflection is exhibited depends on $\Delta n$ of the cholesteric liquid crystalline phase and the helical pitch P and complies with a relationship of $\Delta\lambda = \Delta n \times P$. Therefore, the width of the selective reflection range can be controlled by adjusting $\Delta n$. $\Delta n$ can be adjusted by adjusting a kind of a liquid crystal compound for forming the reflecting dots (the right circularly polarized light reflecting layer and the left circularly polarized light reflecting layer) and a mixing ratio thereof, and a temperature during oriented immobilization. The full width at half maximum of the reflection wavelength range is adjusted depending on the application of the transparent screen 12 and is, for example, 50 to 500 nm and preferably 100 to 300 nm.

The reflecting dot obtained by immobilizing a cholesteric liquid crystalline phase has a stripe pattern including bright portions and dark portions in a cross-sectional thereof. In a case where the cross-sectional view of the reflecting dot obtained by immobilizing a cholesteric liquid crystalline phase is observed with a scanning electron microscope, an angle between a normal line perpendicular to a line, which is formed using a first dark portion from a surface of the reflecting dot opposite to the support 32, and the surface of the reflecting dot opposite to the support 32 is preferably in a range of 70° to 90°.

In the following description, "the surface of the reflecting dot opposite to the support 32" will also simply referred to as "the surface of the reflecting dot".

Figure 2:
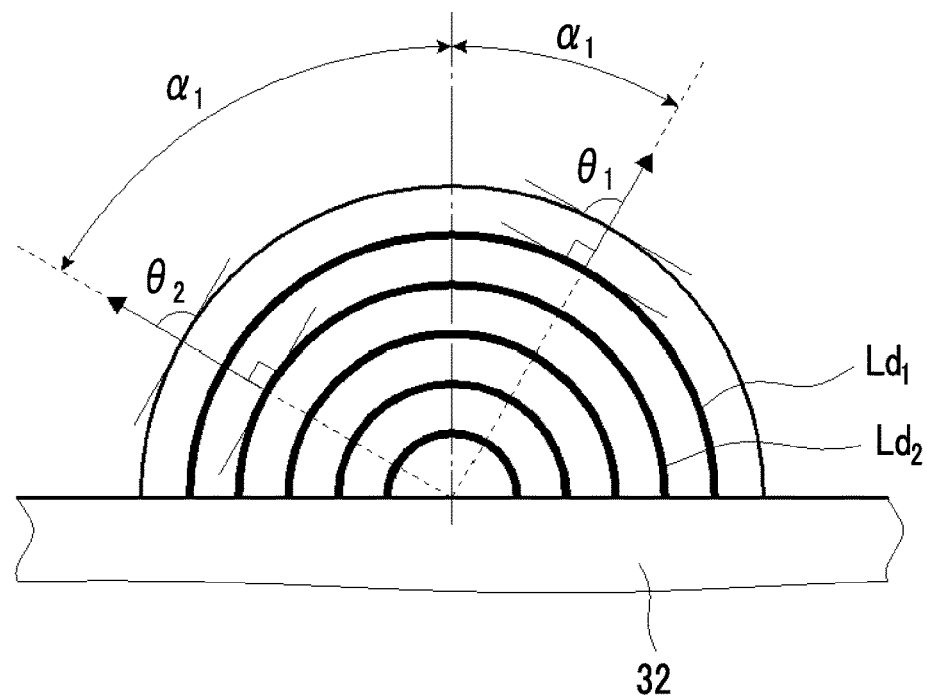
FIG. 2 is a conceptual diagram showing an action of the transparent screen according to the embodiment of the present invention.

FIG. 2 shows a schematic diagram of the cross-section of the reflecting dot. In FIG. 2, lines which are formed using the dark portions are indicated by thick lines. As shown in FIG. 2, an angle $\theta_1$ between a normal line (broken line) perpendicular to a line $Ld_1$, which is formed using the first dark portion, and the surface of the reflecting dot is preferably 70° to 90°.

Here, in a case where a position of the surface of the reflecting dot is represented by an angle $\alpha_1$ with respect to a line (chain line) perpendicular to the surface of the support 32 which passes through the center of the reflecting dot, it is preferable that, at a position where the angle $\alpha_1$ is 30° and a position where the angle $\alpha_1$ is 60°, the angle between the normal line perpendicular to the line $Ld_1$, which is formed using the first dark portion from the surface of the reflecting dot, and the surface of the reflecting dot is preferably in a range of 70° to 90°, and it is more preferable that, at all the positions of the surface of the reflecting dot, the angle between the normal line perpendicular to the line $Ld_1$, which is formed using the first dark portion from the surface of the reflecting dot, and the surface of the reflecting dot is preferably in a range of 70° to 90°.

That is, it is preferable that the angle satisfies the above-described range at some positions of the surface of the reflecting dot. For example, it is preferable that the angle satisfies the above-described range not intermittently but continuously at some positions of the surface of the reflecting dot. In a case where the surface of the reflecting dot is curved in a cross-sectional view, the angle between the normal line perpendicular to the line, which forms the dark portion, and the surface of the reflecting dot refers to an angle between a tangent line of the surface of the reflecting dot and the normal line. In addition, the angle between the normal line and the surface of the reflecting dot is expressed by an acute angle and is in a range of 70° to 110° in case of being expressed by an angle of 0° to 180°.

In a cross-sectional view of the reflecting dot, it is preferable that an angle $\theta_2$ between a normal line perpendicular to a line $Ld_2$, which is formed using a second dark portion from the surface of the reflecting dot, and the surface of the reflecting dot is preferably in a range of 70° to 90°, it is more preferable that an angle $\theta$ between a normal line perpendicular to each of lines, which are formed using third and fourth dark portions from the surface of the reflecting dot, and the surface of the reflecting dot is preferably in a range of 70° to 90°, and it is still more preferable that an angle θ between a normal line perpendicular to each of lines, which are formed using fifth to twelfth dark portions from the surface of the reflecting dot, and the surface of the reflecting dot is preferably in a range of 70° to 90°.

Further, the angle between the normal line perpendicular to the line, which is formed using the dark portion, and the surface of the reflecting dot is more preferably 80° to 90° and still more preferably 85° to 90°.

The cross-sectional view of the reflecting dot observed with a SEM shows that an angle between the helical axis of the cholesteric liquid crystalline phase and the surface of the reflecting dot (or a tangent line thereof) is in a range of 70° to 90°.

Due to the above-described structure, light incident on the reflecting dot in a direction with an angle from a normal direction perpendicular to the support 32 can be made to be incident at an angle, which is substantially parallel to the helical axis direction of the cholesteric liquid crystalline phase, on the surface of the reflecting dot. Therefore, light which is incident on the reflecting dot can be reflected in various directions.

In addition, the reflecting dot specularly reflects incidence light with respect to the helical axis of the cholesteric liquid crystalline phase. Therefore, as conceptually shown in FIG. 3, light In is incident from the normal direction perpendicular to the support 32, whereas reflected light Ir reflected from the vicinity of the reflecting dot is reflected parallel to the normal direction perpendicular to the support. On the other hand, at a position which deviates from the center of the reflecting dot (a position where the helical axis of the cholesteric liquid crystalline phase is inclined with respect to the normal direction perpendicular to the support 32), the reflected light Ir is reflected in a direction different from the normal direction perpendicular to the support 32. Accordingly, light which is incident on the reflecting dot can be reflected in various directions, and the viewing angle can be widened. In addition, light Ip which is transmitted through the reflecting dot is transmitted in the same direction as that of the incidence light In. Therefore, the scattering of the transmitted light can be suppressed to reduce the haze, and the transparency can be improved.

In addition, it is preferable that light incident from the normal direction perpendicular to the support 32 can be reflected in all the directions. In particular, it is preferable that an angle (half power angle) in which the brightness is half of the front brightness (peak brightness) can be made to be 35° or more and that high reflecting properties are exhibited.

It is preferable that, by making the helical axis of the cholesteric liquid crystalline phase to form an angle of 70° to 90° with the surface of the reflecting dot, an angle between a normal direction perpendicular to a line, which is formed using a first dark portion from the surface, and a normal direction perpendicular to the support continuously decreases along with a continuous increase in the height.

The cross-sectional view is a cross-sectional view of a surface in any direction including a portion having a height which continuously increases to a maximum height in a direction moving from an end portion of the dot to the center of the dot. Typically, the cross-sectional view may be a cross-sectional view of any surface which includes the center of the dot and is perpendicular to the support.

<<Method of Preparing Reflecting Dots>>

The reflecting dots (the red right circularly polarized light reflecting dots 34rR, the green right circularly polarized light reflecting dots 34gR, the blue right circularly polarized light reflecting dots 34bR, the red left circularly polarized light reflecting dots 34rL, the green left circularly polarized light reflecting dots 34gL, and the blue left circularly polarized light reflecting dots 34bL) can be obtained by immobilizing a cholesteric liquid crystalline phase in a dot shape.

The structure in which a cholesteric liquid crystalline phase is immobilized may be a structure in which the orientation of the liquid crystal compound as a cholesteric liquid crystalline phase is immobilized. Typically, the structure in which a cholesteric liquid crystalline phase is immobilized may be a structure which is obtained by making the polymerizable liquid crystal compound to be in a state where a cholesteric liquid crystalline phase is oriented, polymerizing and curing the polymerizable liquid crystal compound with ultraviolet irradiation, heating, or the like to form a layer having no fluidity, and concurrently changing the state of the polymerizable liquid crystal compound into a state where the oriented state is not changed by an external field or an external force.

The structure in which a cholesteric liquid crystalline phase is immobilized is not particularly limited as long as the optical characteristics of the cholesteric liquid crystalline phase are maintained, and the liquid crystal compound does not necessarily exhibit liquid crystallinity. For example, the molecular weight of the polymerizable liquid crystal compound may be increased by a curing reaction such that the liquid crystallinity thereof is lost.

Examples of a material used for forming the reflecting dots obtained by immobilizing a cholesteric liquid crystalline phase include a liquid crystal composition including a liquid crystal compound. It is preferable that the liquid crystal compound is a polymerizable liquid crystal compound.

It is preferable that the liquid crystal composition including a liquid crystal compound for forming the reflecting dots further includes a surfactant. In addition, the liquid crystal composition used for forming the reflecting dots may further include a chiral agent and a polymerization initiator.

——Polymerizable Liquid Crystal Compound——

The polymerizable liquid crystal compound may be a rod-shaped liquid crystal compound or a disk-shaped liquid crystal compound and is preferably a rod-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanophenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3. Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770, 107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

Specific examples of the polymerizable liquid crystal compound include compounds represented by the following Formulae (1) to (11).

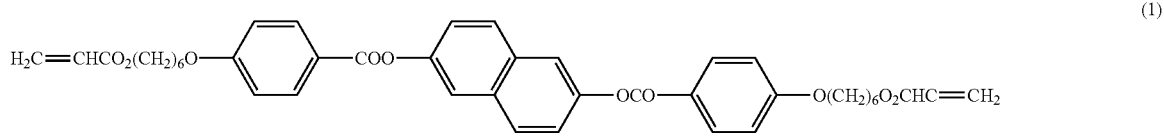

(1)

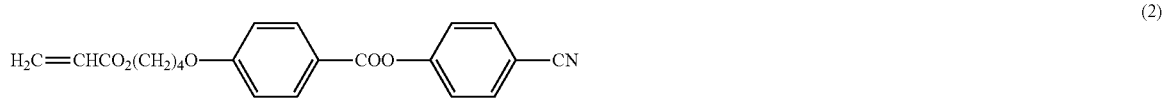

(2)

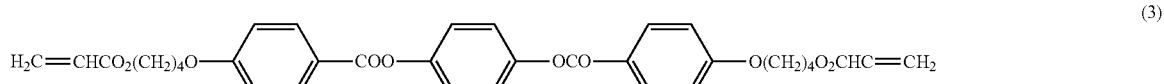

(3)

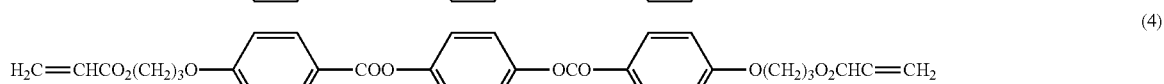

(4)

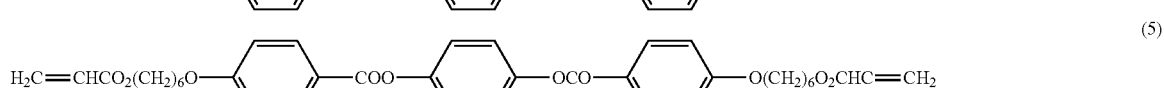

(5)

(6)

(7)

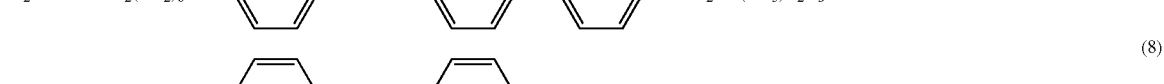

(8)

(9)

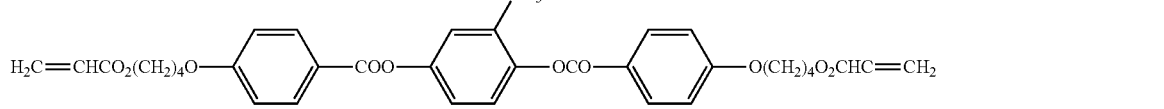

(10)

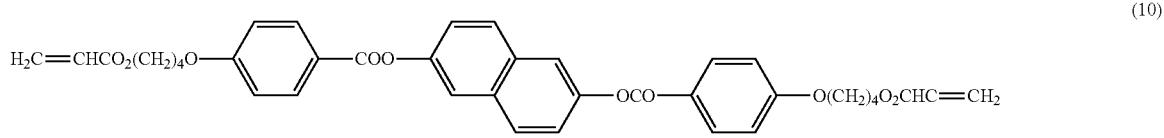

(11)

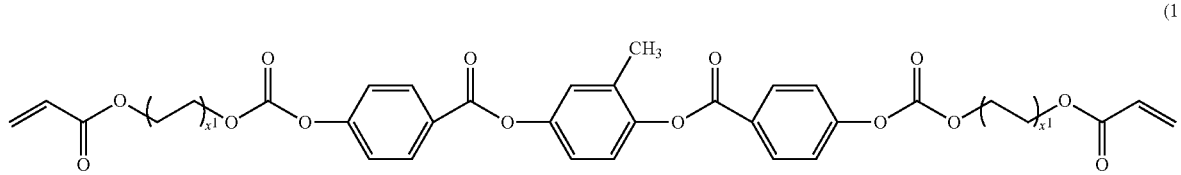

[In Compound (11), $X^1$ represents 2 to 5 (integer).]

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecularweight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

——Surfactant——

The present inventors found that, by adding the surfactant to the liquid crystal composition during the formation of the reflecting dot, the polymerizable liquid crystal compound is oriented to be parallel to an air interface side, and the helical axis direction of the reflecting dot is controlled as described above.

In general, for the formation of the dot, it is necessary that the surface tension is not decreased to maintain a liquid droplet shape during printing. Therefore, it is surprising that the reflecting dot can be formed even after the addition of the surfactant and that the reflecting dot exhibits high retroreflection properties in multiple directions. According to the investigation of the present inventors, in a case where the surfactant is used, a reflecting dot is formed such that an angle between the surface of the reflecting dot and the support 32 in an end portion of the reflecting dot is 40° or higher. That is, by adding the surfactant during the formation of the reflecting dot, the contact angle between the reflecting dot and the support 32 can be formed in an angle range where a wide viewing angle and high transparency can be simultaneously realized.

It is preferable that the surfactant is a compound which can function as an orientation controller contributing to the stable or rapid formation of a cholesteric liquid crystalline phase with planar orientation. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and "0082" to "0085" of JP2002-129162A, and fluorine (meth)acrylate polymers described in paragraphs "0018" to "0043" of JP2007-272185A.

As a horizontal orientation agent, one kind may be used alone, or two or more kinds may be used in combination.

As the fluorine surfactant, a compound represented by the following Formula (I) described in paragraphs "0082" to "0090" of JP2014-119605A is preferable.

$(Hb^{11}\text{-}Sp^{11}\text{-}L^{11}\text{-}SP^{12}\text{-}L^{12})_{m11}\text{-}A^{11}\text{-}L^{13}\text{-}T^{11}\text{-}L^{14}\text{-}A^{12}\text{-}$
$(L^{15}\text{-}Sp^{13}\text{-}L^{16}\text{-}Sp^{14}\text{-}Hb^{11})_{n11}$  Formula (I)

In Formula (I), $L^{11}$, $L^{12}$, $L^{13}$, $L^{14}$, $L^{15}$, and $L^{16}$ each independently represent a single bond, —O—, —S—, —CO—, —COO—, —OCO—, —COS—, —SCO—, —NRCO—, or —CONR— (in Formula (I), R represents a hydrogen atom or an alkyl group having 1 to 6 carbon atoms). —NRCO— or —CONR— has an effect of reducing solubility and is likely to increase haze during the preparation of the dot. From this viewpoint, —O—, —S—, —CO—, —COO—, —OCO—, —COS— or —SCO— is more preferable. From the viewpoint of the stability of the compound, —O—, —CO—, —COO—, or —OCO— is more preferable. The alkyl group represented by R may be linear or branched. An alkyl group having 1 to 3 carbon atoms is more preferable, and examples thereof include a methyl group, an ethyl group, and an n-propyl group.

$Sp^{11}$, $Sp^{12}$, $Sp^{13}$, and $Sp^{14}$ each independently represent a single bond or an alkylene group having 1 to 10 carbon atoms, more preferably a single bond or an alkylene group having 1 to 7 carbon atoms, and still more preferably a single bond or an alkylene group having 1 to 4 carbon atoms. However, a hydrogen atom in the alkylene group may be substituted with a fluorine atom. The alkylene group may have a branch or not, and a linear alkylene group having no branch is preferable. From the viewpoint of synthesis, it is preferable that $Sp^{11}$ and $Sp^{14}$ are the same and $Sp^{12}$ and $Sp^{13}$ are the same.

$A^{11}$ and $A^{12}$ represent a monovalent to tetravalent aromatic hydrocarbon group. The number of carbon atoms in the aromatic hydrocarbon group is preferably 6 to 22, more preferably 6 to 14, still more preferably 6 to 10, and still more preferably 6. The aromatic hydrocarbon group represented by $A^{11}$ or $A^{12}$ may have a substituent. Examples of the substituent include an alkyl group having 1 to 8 carbon atoms, an alkoxy group, a halogen atom, a cyano group, and an ester group. The description and preferable ranges of the groups can be found in the corresponding description of T described below. Examples of a substituent with which the aromatic hydrocarbon group represented by $A^{11}$ or $A^{12}$ is substituted include a methyl group, an ethyl group, a methoxy group, an ethoxy group, a bromine atom, a chlorine atom, and a cyano group. A molecule including a large amount of a perfluoroalkyl portion can cause liquid crystal to be oriented even in a small addition amount, which leads to reduction in haze. Therefore, in order for the molecule to include many perfluoroalkyl groups, it is preferable that $A^{11}$ and $A^{12}$ are tetravalent. From the viewpoint of synthesis, it is preferable that $A^{11}$ and $A^{12}$ are the same.

$T^{11}$ represents a divalent group or a divalent heterocyclic group preferably represented by any one of the following formulae (X in $T^{11}$ represents an alkyl group having 1 to 8 carbon atoms, an alkoxy group, a halogen atom, a cyano group, or an ester group, and Ya, Yb, Yc, and Yd each independently represent a hydrogen atom or an alkyl group having 1 to 4 carbon atoms),

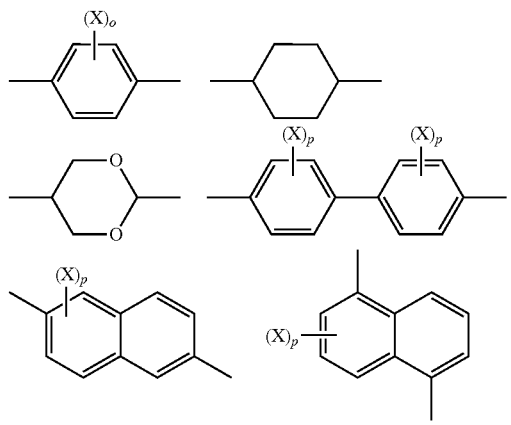

-continued

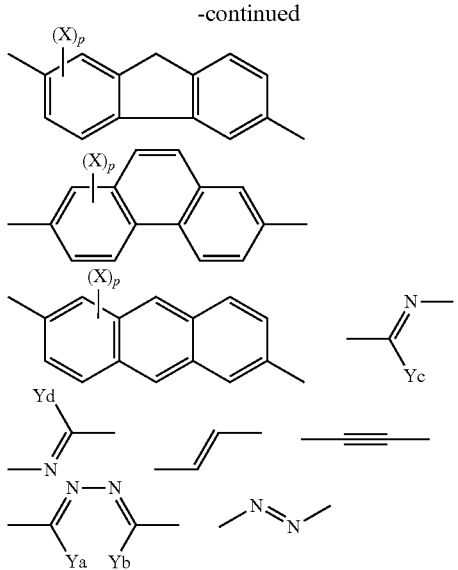

more preferably represented by any one of the following formulae,

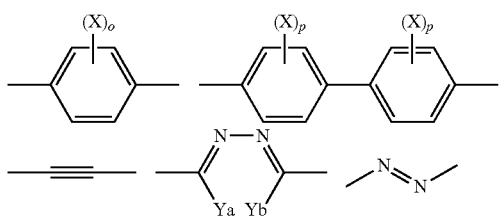

still more preferably represented by any one of the following formulae.

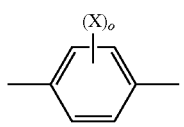

The number of carbon atoms in the alkyl group represented by X in $T^{11}$ is 1 to 8, preferably 1 to 5, and more preferably 1 to 3. The alkyl group may be linear, branched, or cyclic and is preferably linear or branched. Preferable examples of the alkyl group include a methyl group, an ethyl group, an n-propyl group, and an isopropyl group. Among these, a methyl group is preferable. The details of an alkyl portion of the alkoxy group represented by X in $T^{11}$ can be found in the description and preferable range of the alkyl group represented by X in $T^{11}$. Examples of the halogen atom represented by X in $T^{11}$ include a fluorine atom, a chlorine atom, a bromine atom, and an iodine atom. Among these, a chlorine atom or a bromine atom is preferable. Examples of the ester group represented by X in $T^{11}$ include a group represented by R'COO—. R' represents, for example, an alkyl group having 1 to 8 carbon atoms. The description and preferable range of the alkyl group represented by R' can be found in the description and preferable range of the alkyl group represented by X in $T^{11}$. Specific examples of the ester include $CH_3COO-$ and $C_2H_5COO-$.

The alkyl group having 1 to 4 carbon atoms represented by Ya, Yb, Yc, or Yd may be linear or branched. Examples of the alkyl group having 1 to 4 carbon atoms include a methyl group, an ethyl group, an n-propyl group, and an isopropyl group.

It is preferable that the divalent heterocyclic group has a 5-membered, 6-membered, or 7-membered heterocycle. A 5-membered or 6-membered heterocycle is more preferable, and a 6-membered heterocycle is most preferable. As a heteroatom constituting the heterocycle, a nitrogen atom, an oxygen atom, or a sulfur atom is preferable. It is preferable that the heterocyclic group is an aromatic heterocyclic group. Examples of the heterocycle include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a thin ring, a pyridine ring, a piperidine ring, an oxazine ring, a morpholine ring, a thiazine ring, a pyridazine ring, a pyrimidine ring, a pyrazine ring, a piperazine ring, and a triazine ring. The divalent heterocyclic group may have a substituent. The description and preferable range of the substituent can be found in the description of the substituent with which the monovalent to tetravalent aromatic hydrocarbon represented by $A^1$ or $A^2$ is substituted.

$Hb^{11}$ represents a perfluoroalkyl group having 2 to 30 carbon atoms, more preferably a perfluoroalkyl group having 3 to 20 carbon atoms, and still more preferably a perfluoroalkyl group having 3 to 10 carbon atoms. The perfluoroalkyl group may be linear, branched, or cyclic and is preferably linear or branched and more preferably linear.

m11 and n11 each independently represent 0 to 3 and m11+n11≥1. At this time, a plurality of structures in parentheses may be the same as or different from each other and is preferably the same as each other. m11 and n11 in Formula (I) are determined depending on the valences of $A^{11}$ and $A^{12}$, and preferable ranges thereof are determined depending on the preferable ranges of the valences of $A^{11}$ and $A^{12}$.

o and p in $T^{11}$ each independently represent an integer of 0 or more. In a case where o and p represent an integer of 2 or more, a plurality of X's may be the same as or different from each other. o in $T^{11}$ represents preferably 1 or 2. p in $T^{11}$ represents preferably an integer of 1 to 4 and more preferably 1 to 2.

A molecular structure of the compound represented by Formula (I) may be symmetrical or non-symmetrical. "Symmetry" described herein represents at least one of point symmetry, line symmetry, or rotational symmetry, and "non-symmetry" described herein does not represent any one of point symmetry, line symmetry, or rotational symmetry.

The compound represented by Formula (I) is a combination of the perfluoroalkyl group ($Hb^{11}$), the linking groups -(-$Sp^{11}$-$L^{11}$-$Sp^{12}$-$L^{12}$)$_{m_{11}}$-$A^{11}$-$L^{13}$- and -$L^{14}$-$A^{12}$-($L^{15}$-$Sp^{13}$-$L^{16}$-$Sp^{14}$)$_{n_{11}}$-, and preferably the divalent group having an excluded volume effect which is represented by T. Two perfluoroalkyl groups ($Hb^{11}$) present in the molecule are preferably the same as each other, and the linking groups -(-$Sp^{11}$-$L^{11}$-$Sp^{12}$-$L^{12}$)$_{m_{11}}$-$A^{11}$-$L^{13}$- and -$L^{14}$-$A^{12}$-($L^{15}$-$Sp^{13}$-$L^{16}$-$Sp^{14}$)$_{n_{11}}$- present in the molecule are also preferably the same as each other. $Hb^{11}$-$Sp^{11}$-$L^{11}$-$Sp^{12}$- and -$Sp^{13}$-$L^{16}$-$Sp^{14}$-$Hb^{11}$ present at the terminal are preferably a group represented by any one of the following formulae:

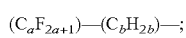

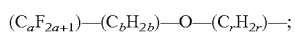

$(C_aF_{2a+1})-(C_bH_{2b})-COO-(C_rH_{2r})-$; and $(C_aF_{2a+1})-(C_bH_{2b})-OCO-(C_rH_{2r})-$.

In the above formulae, a represents preferably 2 to 30, more preferably 3 to 20, and still more preferably 3 to 10. b represents preferably 0 to 20, more preferably 0 to 10, and still more preferably 0 to 5. a+b represents 3 to 30. r represents preferably 1 to 10 and more preferably 1 to 4.

In addition, $Hb^{11}-Sp^{11}-L^{11}-Sp^{12}-L^{12}-$ and $-L^{15}-Sp^{13}-L^{16}-Sp^{14}-Hb^{11}$ present at the terminal of Formula (I) are preferably a group represented by any one of the following formulae:

$(C_aF_{2a+1})-(C_bH_{2b})-O-$;

$(C_aF_{2a+1})-(C_bH_{2b})-COO-$;

$(C_aF_{2a+1})-(C_bH_{2b})-O-(C_rH_{2r})-O-$;

$(C_aF_{2a+1})-(C_bH_{2b})-COO-(C_rH_{2r})-COO-$; and $(C_aF_{2a+1})-(C_bH_{2b})-OCO-(C_rH_{2r})-COO-$.

In the above formulae, a, b, and r have the same definitions as described above.

The addition amount of the surfactant in the liquid crystal composition is preferably 0.01 to 10 mass %, more preferably 0.01 to 5 mass %, and still more preferably 0.02 to 1 mass % with respect to the total mass of the polymerizable liquid crystal compound.

that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by photomask exposure of an actinic ray or the like after coating and orientation, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

Specific examples of the chiral agent include a compound represented by the following Formula (12).

(12)

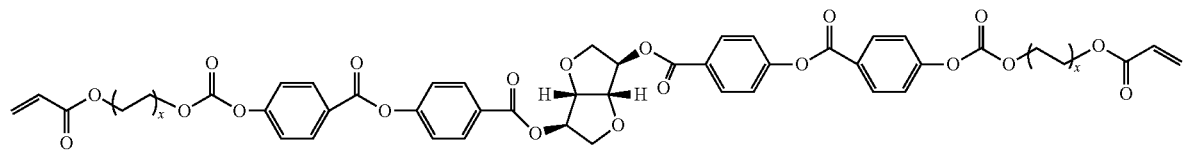

——Chiral Agent (Optically Active Compound)——

The chiral agent has a function of causing a helical structure of a cholesteric liquid crystalline phase to be formed. The chiral agent may be selected depending on the purpose because a helical twisting direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a surface asymmetric compound not having an asymmetric carbon atom can be used. Examples of the axially asymmetric compound or the surface asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable In the formula, X represents 2 to 5 (integer).

The content of the chiral agent in the liquid crystal composition is preferably 0.01 mol % to 200 mol % and more preferably 1 mol % to 30 mol % with respect to the amount of the polymerizable liquid crystal compound.

——Polymerization Initiator——

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation. Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triaryl imidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the polymerizable liquid crystal compound.

——Crosslinking Agent——

In order to improve the film hardness after curing and to improve durability, the liquid crystal composition may include a crosslinking agent. As the crosslinking agent, a curing agent which can perform curing with ultraviolet light, heat, moisture, or the like can be preferably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris [3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these curing agents, one kind may be used alone, or two or more kinds may be used in combination.

The content of the crosslinking agent is preferably 3 to 20 mass % and more preferably 5 to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

——Other Additives——

In a case where an ink jet method described below is used for forming the reflecting dot, the liquid crystal composition may include a monofunctional polymerizable monomer in order to obtain generally required ink properties. Examples of the monofunctional polymerizable monomer include 2-methoxyethyl acrylate, isobutyl acrylate, isooctyl acrylate, isodecyl acrylate, and octyl/decyl acrylate.

In addition, optionally, a polymerization inhibitor, an antioxidant, an ultraviolet absorber, a light stabilizer, a colorant, metal oxide particles or the like can be added to the liquid crystal composition in a range where optical performance and the like do not deteriorate.

It is preferable that the liquid crystal composition is used as a liquid during the formation of the reflecting dot.

The liquid crystal composition may include a solvent. The solvent is not particularly limited and can be appropriately selected depending on the purpose. An organic solvent is preferably used.

The organic solvent is not particularly limited and can be appropriately selected depending on the purpose. Examples of the organic solvent include a ketone such as methyl ethyl ketone or methyl isobutyl ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden. The above-described component such as the above-described monofunctional polymerizable monomer may function as the solvent.

The liquid crystal composition is applied to the support 32 in a dot shape and then is cured to form a reflecting dot.

During the formation of the reflecting dot, the application of the liquid crystal composition to the support 32 is performed, for example, using a printing method and preferably by jetting. The printing method is not particularly limited and, for example, an ink jet method, a gravure printing method, or a flexographic printing method can be used. Among these, an ink jet method is preferable. The pattern of the reflecting dots can also be formed using a well-known printing technique.

The liquid crystal composition applied to the support 32 is optionally dried or heated and then is cured to form the reflecting dot. In the drying and/or heating step, the polymerizable liquid crystal compound in the liquid crystal composition only has to be oriented. In the case of heating, the heating temperature is preferably 200° C. or lower and more preferably 130° C. or lower.

The oriented liquid crystal compound may be further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 to 50 J/cm$^2$ and more preferably 100 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm. From the viewpoint of stability, the polymerization degree is preferably high, and is preferably 70% or higher and more preferably 80% or higher.

The polymerization degree can be determined by obtaining a consumption ratio between polymerizable functional groups using an infrared (IR) absorption spectrum.

<Overcoat Layer>

Each of the dot laminates (the red right circularly polarized light dot laminate 30rR, the green right circularly polarized light dot laminate 30gR, the blue right circularly polarized light dot laminate 30bR, the red left circularly polarized light dot laminate 30rL, the green left circularly polarized light dot laminate 30gL, and the blue left circularly polarized light dot laminate 30bL) includes the overcoat layer 36 that embeds the reflecting dots and is laminated on the support 32.

The overcoat layer 36 is not particularly limited as long as it is provided on the surface of the support 32 where the reflecting dots are formed, and it is preferable that the surface of the dot laminate is smoothened.

In the example shown in the drawing, the right and left polarized light dot films are prepared by bonding the dot laminates to each other using the overcoat layer 36. Alternatively, as in the case of the above-described bonding layer that bonds the respective films to each other, the right and left polarized light dot films may be prepared by bonding the dot laminates to each other using the bonding layer.

The overcoat layer 36 is not particularly limited, it is preferable that a difference in refractive index between the overcoat layer 36 and the reflecting dot is as low as possible, and the difference in refractive index is preferably 0.04 or lower. Since the refractive index of the reflecting dot is about 1.6, it is preferable that the overcoat layer 36 is a resin layer having a refractive index of about 1.4 to 1.8.

By using the overcoat layer 36 having a refractive index similar to the refractive index of the reflecting dot, the angle (polar angle) of light incident on the reflecting dot from the normal line can be reduced. For example, in a case where the overcoat layer 36 having a refractive index of 1.6 is used and light is incident on the transparent screen at a polar angle of 45°, a polar angle at which light is actually incident on the reflecting dot can be made to be about 27°. Therefore, by using the overcoat layer 36, the polar angle of light at which the transparent screen 12 exhibits retroreflection properties can be widened, and high retroreflection properties can be obtained at a wider angle even in a case where the angle between the surface of the reflecting dot and the support 32 is small. In addition, the overcoat layer 36 may function as an antireflection layer or a hard coat layer.

Examples of the overcoat layer 36 include a resin layer which is obtained by applying a composition including a monomer to the surface of the support 32 where the reflecting dots are formed, and curing the coating film.

A resin used for the overcoat layer 36 is not particularly limited and may be selected in consideration of the adhesiveness between the support 32 and the reflecting dots or the like. For example, a thermoplastic resin, a thermosetting resin, or an ultraviolet curable resin can be used. From the viewpoints of durability, solvent resistance, and the like, a resin which is curable by crosslinking is preferable, and an ultraviolet curable resin which is curable within a short period of time is more preferable. Examples of the monomer which can be used for forming the overcoat layer 36 include ethyl (meth)acrylate, ethylhexyl (meth)acrylate, styrene, methylstyrene, N-vinylpyrrolidone, polymethylol propane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

The thickness of the overcoat layer 36 may be selected depending on the maximum height of the reflecting dot without any particular limitation, and may be about 5 to 100 μm and is preferably 10 to 50 μm and more preferably 20 to 40 μm. The thickness is the distance from a surface of the support, where the dots are formed, to a surface of the overcoat layer provided on a surface of the support, where the dots are not formed, which is opposite to the surface where the dots are formed.

The transparent screen 12 further includes the right polarized light reflecting layer film 26 and the left polarized light reflecting layer film 28.

In the right polarized light reflecting layer film 26, a red right circularly polarized light reflecting layer 42rR, a green right circularly polarized light reflecting layer 42gR, and a blue right circularly polarized light reflecting layer 42bR are laminated on the support 40.

The red right circularly polarized light reflecting layer 42rR is a uniform layer obtained by immobilizing a cholesteric liquid crystalline phase, reflects red right circularly polarized light, and allows transmission of the other light components.

The green right circularly polarized light reflecting layer 42gR is a uniform layer obtained by immobilizing a cholesteric liquid crystalline phase, reflects green right circularly polarized light, and allows transmission of the other light components.

Further, the blue right circularly polarized light reflecting layer 42bR is a uniform layer obtained by immobilizing a cholesteric liquid crystalline phase, reflects blue right circularly polarized light, and allows transmission of the other light components.

That is, these reflecting layers have different selective reflection wavelengths. In addition, each of the reflecting layers has a selective reflection wavelength equal to that of any one of the reflecting layers of the left polarized light reflecting layer film 28. Further, the reflecting layers of the right polarized light reflecting layer film 26 and the reflecting dots of the right polarized light dot film 20 reflect right circularly polarized light, that is, reflect circularly polarized light in the same rotation direction.

On the other hand, in the left polarized light reflecting layer film 28, a red left circularly polarized light reflecting layer 42rL, a green left circularly polarized light reflecting layer 42gL, and a blue left circularly polarized light reflecting layer 42bL are laminated on the support 40.

The red left circularly polarized light reflecting layer 42rL is a uniform layer obtained by immobilizing a cholesteric liquid crystalline phase, reflects red left circularly polarized light, and allows transmission of the other light components.

The green left circularly polarized light reflecting layer 42gL is a uniform layer obtained by immobilizing a cholesteric liquid crystalline phase, reflects green left circularly polarized light, and allows transmission of the other light components.

Further, the blue left circularly polarized light reflecting layer 42bL is a uniform layer obtained by immobilizing a cholesteric liquid crystalline phase, reflects blue left circularly polarized light, and allows transmission of the other light components.

That is, these reflecting layers have different selective reflection wavelengths. In addition, each of the reflecting layers has a selective reflection wavelength equal to that of any one of the reflecting layers of the right polarized light reflecting layer film 26. Further, the reflecting layers of the left polarized light reflecting layer film 28 and the reflecting dots of the left polarized light dot film 24 reflect left circularly polarized light, that is, reflect circularly polarized light in the same rotation direction.

The red right circularly polarized light reflecting layer 42rR, the green right circularly polarized light reflecting layer 42gR, the blue right circularly polarized light reflecting layer 42bR, the red left circularly polarized light reflecting layer 42rL, the green left circularly polarized light reflecting layer 42gL, the blue left circularly polarized light reflecting layer 42bL are uniform layers (films) as described above, that is, are layers (films) that are uniform over the entire surface and are so-called solid layers (solid films).

In the following description, in a case where it is not necessary to distinguish the red right circularly polarized light reflecting layer 42rR, the green right circularly polarized light reflecting layer 42gR, the blue right circularly polarized light reflecting layer 42bR, the red left circularly polarized light reflecting layer 42rL, the green left circularly polarized light reflecting layer 42gL, and the blue left circularly polarized light reflecting layer 42bL from each other, these reflecting layers will also collectively referred to as "reflecting layers".

The support 40 supports the three reflecting layers and may be formed of the same material of the support 32 used for forming the above-described dot laminates.

As described above, the reflecting layers are layers obtained by immobilizing a cholesteric liquid crystalline phase.

As a liquid crystal compound for forming these reflecting layers, the same material as the liquid crystal compound used for forming the reflecting dots and preferably the same material as the polymerizable liquid crystal compound can be used.

Accordingly, the right polarized light reflecting layer film 26 and the left polarized light reflecting layer film 28 including these reflecting layers may be prepared as in the case of the reflecting dots by preparing a liquid crystal composition including the liquid crystal compound to form each of the reflecting layers such that a cholesteric liquid crystalline phase having a helical pitch corresponding to the corresponding wavelength range and having a helical twisting direction corresponding to circularly polarized light to be reflected is immobilized.

For example, in the case of the right polarized light reflecting layer film 26, as in the case of the liquid crystal composition for forming the reflecting dots, a liquid crystal composition for forming the red right circularly polarized light reflecting layer 42rR, a liquid crystal composition for forming the green right circularly polarized light reflecting layer 42gR, and a liquid crystal composition for forming the blue right circularly polarized light reflecting layer 42bR are prepared.

Next, the red right circularly polarized light reflecting layer 42rR is formed by uniformly applying the liquid crystal composition for forming the red right circularly polarized light reflecting layer 42rR to a surface of the support 40, drying the liquid crystal composition, and further curing the liquid crystal composition as in the case of the reflecting dots. For the application of the liquid crystal composition, all the well-known methods such as a bar coating method or a spin coating method capable of uniformly applying liquid to a sheet-like material can be used.

Next, similarly, the green right circularly polarized light reflecting layer 42gR is formed by applying the liquid crystal composition for forming the green right circularly polarized light reflecting layer 42gR to the red right circularly polarized light reflecting layer 42rR, drying the liquid crystal composition, and curing the liquid crystal composition. Further, similarly, the blue right circularly polarized light reflecting layer 42bR is formed by applying the liquid crystal composition for forming the blue right circularly polarized light reflecting layer 42bR to the green right circularly polarized light reflecting layer 42gR, drying the liquid crystal composition, and curing the liquid crystal composition. As a result, the right polarized light reflecting layer film 26 is prepared.

The left polarized light reflecting layer film 28 can also be prepared using the above-described method.

In the example shown in the drawing, the right polarized light reflecting layer film 26 has a configuration in which the three layers including the red right circularly polarized light reflecting layer 42rR, the green right circularly polarized light reflecting layer 42gR, and the blue right circularly polarized light reflecting layer 42bR are formed on the single support 40, but the present invention is not limited thereto.

For example, the right polarized light reflecting layer film 26 may be obtained by preparing an optical element in which the red right circularly polarized light reflecting layer 42rR is formed on the support 40, an optical element in which the green right circularly polarized light reflecting layer 42gR is formed on the support 40, and an optical element in which the blue right circularly polarized light reflecting layer 42bR is formed on the support 40 and bonding the three optical elements to each other using the same bonding layer as described above. This point is also applicable to the left polarized light reflecting layer film 28.

The image display system 10 according to the embodiment of the present invention includes: the transparent screen 12 in which the right polarized light dot film 20, the left polarized light dot film 24, the right polarized light reflecting layer film 26, and the left polarized light reflecting layer film 28 are laminated; and the projector 14.

The projector 14 is a well-known projector that displays an image on the transparent screen 12 by optionally performing keystone correction (distortion correction) and projecting projection light that carries the image to the transparent screen 12.

Here, in the image display system 10 shown in FIG. 1 in which the transparent screen 12 includes the dot films and the films corresponding to both right circularly polarized light and left circularly polarized light, the projector 14 is a projector of which outgoing light is unpolarized light. In the image display system 10, all the well-known projectors of which outgoing light is unpolarized light, for example, a digital light processing (DLP) projector can be used as long as they are projectors of which outgoing light is unpolarized light.

In the image display system 10 according to the embodiment of the present invention, the projector 14 is preferably a so-called short focal length projector having a short focal length.

In addition, in the image display system 10 according to the embodiment of the present invention, it is preferable that convex sides of the reflecting dots of the dot laminates are disposed to face the projector 14 side, and it is preferable that the image display system 10 is a so-called front projection type in which an image is observed on the projector 14 side.

Further, in the image display system 10 according to the embodiment of the present invention, it is preferable that the projector 14 is disposed such that an incidence angle of outgoing light from the projector 14 is 25° to 75° and preferably 40° to 70° with respect to a normal line perpendicular to the transparent screen 12.

The above-described point is also applicable to, for example, an image display system 50 including a projector 54 of which outgoing light is linearly polarized light. In addition, in projectors 54 and 64 of which outgoing light is linearly polarized light, it is preferable that the outgoing light is a P-wave with respect to the transparent screen, and it is preferable that an incidence angle of light from the projector 14 is 56°±10° with respect to the normal line perpendicular to the transparent screen 12.

Figure 3:
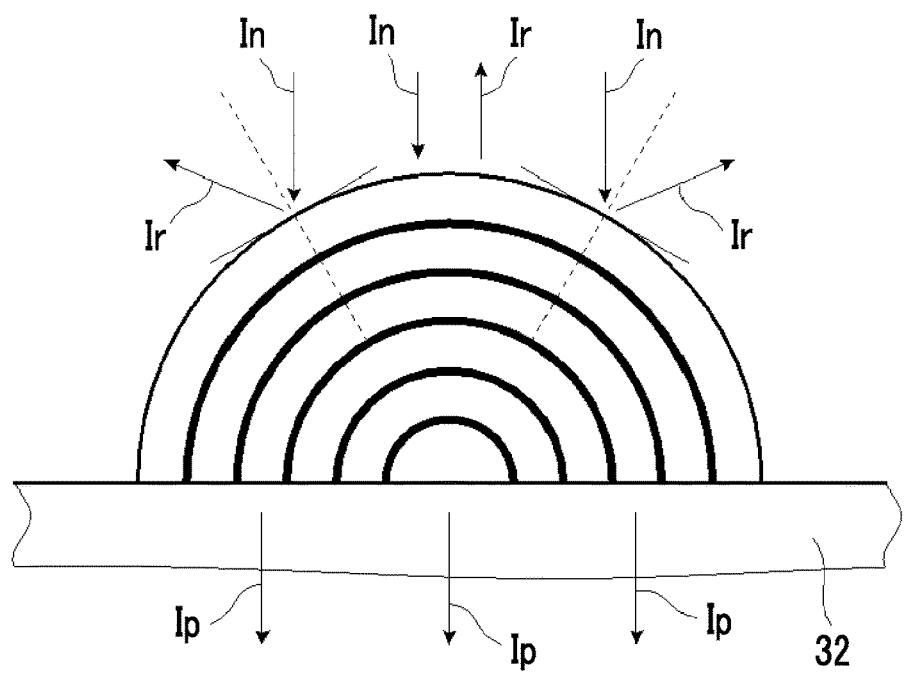
FIG. 3 is a conceptual diagram showing the action of the transparent screen according to the embodiment of the present invention.

As described above, the transparent screen 12 according to the embodiment of the present invention reflects light using the reflecting dots obtained by immobilizing a cholesteric liquid crystalline phase, and an angle between a helical axis of the cholesteric liquid crystalline phase and the surface of the reflecting dot is preferably in a range of 70° to 90° as shown in FIG. 2. As a result, as shown in FIG. 3, the transparent screen 12 can reflect light incident on the reflecting dots not only by retroreflection but also in various directions on the light incidence side.

Therefore, in the image display system 10 according to the embodiment of the present invention, an image can be suitably recognized at a wide viewing angle not only in a case where light is projected from the normal direction perpendicular to the transparent screen but also in a case where light is projected at a large angle with respect to a normal line perpendicular to a projection screen in a projector disposed below the transparent screen, for example, in a short focal length projector.

Accordingly, the image display system 10 according to the embodiment of the present invention is a front projection type, and the incidence angle of the projector 14 with respect to the normal line perpendicular to the transparent screen 12 is 25° to 75°. As a result, the projector 14 can be disposed near the transparent screen such that the image display system can be minimized. Further, since the image display system 10 is a front projection type, an optical path from the projector 14 to an observer can be made to be a folded optical path using the transparent screen. Therefore, the overall optical path length can be reduced, and the image display system can be further minimized.

Hereinafter, the transparent screen 12 and the image display system 10 according to the embodiment of the present invention will be described in more detail by describing the action of the image display system 10.

In the image display system 10, first, projection light carrying an image that is emitted from the projector 14 is incident on the blue right circularly polarized light dot laminate 30bR of the right polarized light dot film 20.

Among the light components incident on the blue right circularly polarized light dot laminate 30bR, only blue right circularly polarized light incident on the blue right circularly polarized light reflecting dots 34bR is reflected from the blue right circularly polarized light reflecting dots 34bR, and the other light components pass through the blue right circularly polarized light reflecting dots 34bR and pass through the blue right circularly polarized light dot laminate 30bR. In addition, light incident on portions other than the blue right circularly polarized light reflecting dots 34bR passes through the blue right circularly polarized light dot laminate 30bR as it is.

Next, the light having passed through the blue right circularly polarized light dot laminate 30bR is incident on the green right circularly polarized light dot laminate 30gR.

In the light incident on the green right circularly polarized light dot laminate 30gR, similarly, only green right circularly polarized light incident on the green right circularly polarized light reflecting dots 34gR is reflected from the green right circularly polarized light reflecting dots 34gR, and light other than the green right circularly polarized light incident on the green right circularly polarized light reflecting dots 34gR and light incident on portions other than the green right circularly polarized light reflecting dots 34gR pass through the green right circularly polarized light dot laminate 30gR.

Next, the light having passed through the green right circularly polarized light dot laminate 30gR is incident on the red right circularly polarized light dot laminate 30rR.

In the light incident on the red right circularly polarized light dot laminate 30rR, similarly, only red right circularly polarized light incident on the red right circularly polarized light reflecting dots 34rR is reflected from the red right circularly polarized light reflecting dots 34rR, and light other than the red right circularly polarized light incident on the red right circularly polarized light reflecting dots 34rR and light incident on portions other than the red right circularly polarized light reflecting dots 34rR pass through the red right circularly polarized light dot laminate 30rR, that is, the right polarized light dot film 20.

Next, the light having passed through the right polarized light dot film 20 (the red right circularly polarized light dot laminate 30rR) is incident on the left polarized light dot film 24.

First, the light incident on the left polarized light dot film 24 is incident on the blue left circularly polarized light dot laminate 30bL. Next, similarly, only blue left circularly polarized light incident on the blue left circularly polarized light reflecting dots 34bL is reflected from the blue left circularly polarized light reflecting dots 34bL, and light other than the blue left circularly polarized light incident on the blue left circularly polarized light reflecting dots 34bL and light incident on portions other than the blue left circularly polarized light reflecting dots 34bL pass through the blue left circularly polarized light dot laminate 30bL.

Next, the light having passed through the blue left circularly polarized light dot laminate 30bL is incident on the green left circularly polarized light dot laminate 30gL.

In the light incident on the green left circularly polarized light dot laminate 30gL, similarly, only green left circularly polarized light incident on the green left circularly polarized light reflecting dots 34gL is reflected from the green left circularly polarized light reflecting dots 34gL, and light other than the green left circularly polarized light incident on the green left circularly polarized light reflecting dots 34gL and light incident on portions other than the green left circularly polarized light reflecting dots 34gL pass through the green left circularly polarized light dot laminate 30gL.

Next, the light having passed through the green left circularly polarized light dot laminate 30gL is incident on the red left circularly polarized light dot laminate 30rL.

In the light incident on the red left circularly polarized light dot laminate 30rL, similarly, only red left circularly polarized light incident on the red left circularly polarized light reflecting dots 34rL is reflected from the red left circularly polarized light reflecting dots 34rL, and light other than the red left circularly polarized light incident on the red left circularly polarized light reflecting dots 34rL and light incident on portions other than the red left circularly polarized light reflecting dots 34rL pass through the red left circularly polarized light dot laminate 30rL and pass through the left polarized light dot film 24.

An image is displayed (projected) on the transparent screen 12 by the red, green, and blue right circularly polarized light components reflected from the blue right circularly polarized light reflecting dots 34bR, the green right circularly polarized light reflecting dots 34gR, and the red right circularly polarized light reflecting dots 34rR and by the red, green, and blue left circularly polarized light components reflected from the blue left circularly polarized light reflecting dots 34bL, the green left circularly polarized light reflecting dots 34gL, and the red left circularly polarized light reflecting dots 34rL.

Next, the light having passed through the left polarized light dot film 24 (the red left circularly polarized light dot laminate 30rL) is incident on the right polarized light reflecting layer film 26.

First, the light incident on the right polarized light reflecting layer film 26 is incident on the blue right circularly polarized light reflecting layer 42bR, only blue right circularly polarized light is reflected, and the other light components pass through the blue right circularly polarized light reflecting layer 42bR.

Next, the light having passed through the blue right circularly polarized light reflecting layer 42bR is incident on the green right circularly polarized light reflecting layer 42gR, only green right circularly polarized light is reflected, and the other light components pass through the green right circularly polarized light reflecting layer 42gR.

Next, the light having passed through the green right circularly polarized light reflecting layer 42gR is incident on the red right circularly polarized light reflecting layer 42rR, only red right circularly polarized light is reflected, and the other light components pass through the red right circularly polarized light reflecting layer 42rR, that is, the right polarized light reflecting layer film 26.

Next, the light having passed through the right polarized light reflecting layer film 26 (the red right circularly polarized light reflecting layer 42rR) is incident on the left polarized light reflecting layer film 28.

First, the light incident on the left polarized light reflecting layer film 28 is incident on the blue left circularly polarized light reflecting layer 42*b*L, only blue left circularly polarized light is reflected, and the other light components pass through the blue left circularly polarized light reflecting layer 42*b*L.

Next, the light having passed through the blue left circularly polarized light reflecting layer 42*b*L is incident on the green left circularly polarized light reflecting layer 42*g*L, only green left circularly polarized light is reflected, and the other light components pass through the green left circularly polarized light reflecting layer 42*g*L.

Next, the light having passed through the green left circularly polarized light reflecting layer 42*g*L is incident on the red left circularly polarized light reflecting layer 42*r*L, only red left circularly polarized light is reflected, and the other light components pass through the red left circularly polarized light reflecting layer 42*r*L, that is, the left polarized light reflecting layer film 28.

As described above, in the transparent screen 12, an image is displayed by the light components reflected from the right polarized light dot film 20 and the left polarized light dot film 24. In addition, light which is not used for displaying the image passes through the transparent screen.

That is, in the case of the transparent screen that displays an image using the dots reflecting light, light which is not incident on the dots and light which passes through the dots pass through the transparent screen and are observed from a surface of the transparent screen opposite to the projector 14. In the following description, regarding each of various layers and films, a surface opposite to the projector 14 will also be referred to as "back surface".

Therefore, on the back surface side, a light source of the projector 14 is observed and a hot spot occurs in a case where outgoing light of the projector is observed from a straight advancing direction through the transparent screen. The hot spot is significantly glaring. In particular, in the case of a laser projector in which a laser is used as a light source as described below, the hot spot is extremely glaring.

On the other hand, in the transparent screen 12 according to the embodiment of the present invention, the right polarized light reflecting layer film 26 that reflects the red, green, and blue right circularly polarized light components and the left polarized light reflecting layer film 28 that reflects the red, green, and blue left circularly polarized light components are provided on the back surface side of the left polarized light dot film 24.

Therefore, the circularly polarized light having passed through the right polarized light dot film 20 and the left polarized light dot film 24 is reflected from the right polarized light reflecting layer film 26 and the left polarized light reflecting layer film 28, and thus the hot spot can be significantly suppressed.

In addition, the right polarized light reflecting layer film 26 and the left polarized light reflecting layer film 28 do not reflect in the entire wavelength range of visible light, and has a wavelength range so as not to reflect light in a wavelength range between red light and green light, a wavelength range between green light and blue light, or a long or short wavelength range of visible light. Therefore, in the transparent screen 12 according to the embodiment of the present invention, the hot spot caused by the right polarized light reflecting layer film 26 and the left polarized light reflecting layer film 28 can be suppressed, and high transparency can also be secured. Further, as described above, light passes through the transparent screen 12 as it is without being scattered, and thus the haze is also low.

Further, in the present invention, light is reflected from the reflecting dots obtained by immobilizing a cholesteric liquid crystalline phase and preferably light is reflected from reflecting dots in which an angle between a helical axis of the cholesteric liquid crystalline phase and the surface of the reflecting dot is in a range of 70° to 90° as shown in FIG. 2 such that an image is displayed on the transparent screen 12.

Therefore, as shown in FIG. 3, the reflecting dots of the transparent screen 12 can reflect incidence light not only by retroreflection but also in various directions on the light incidence side. Accordingly, a wide viewing angle can be realized even in a case where projection light is incident on the transparent screen at a large angle with respect to the normal line perpendicular to the transparent screen in a short focal length projector disposed near the transparent screen 12.

As a result, according to the embodiment of the present invention, a high-quality image can be observed with a small front projection type image display system at a wide viewing angle with reflected light having a sufficient light amount.

Figure 4:
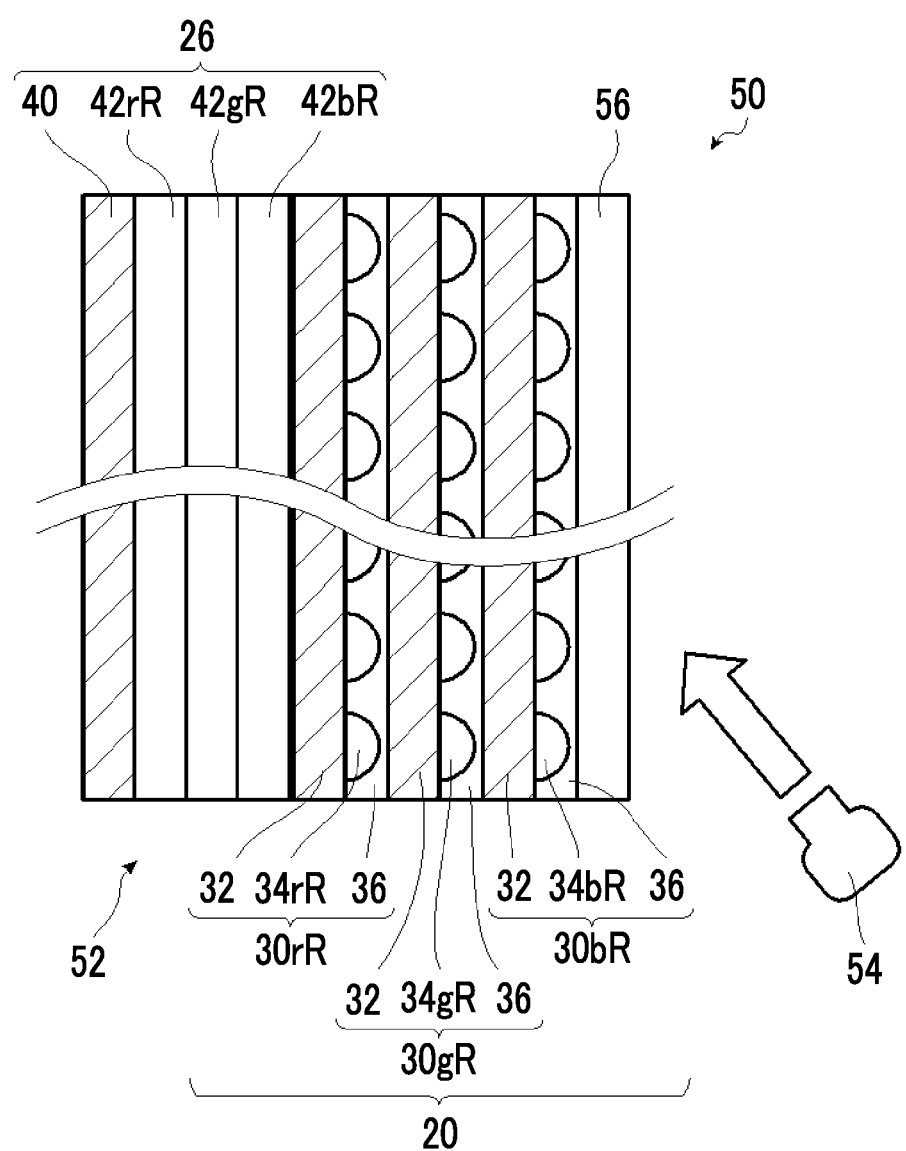
FIG. 4 is a diagram conceptually showing another example of the image display system according to the embodiment of the present invention.

FIG. 4 conceptually shows another example of the image display system according to the embodiment of the present invention including another example of the transparent screen according to the embodiment of the present invention.

In the image display system 50 shown in FIG. 4, the same members as those of the image display system 10 shown in FIG. 1 are widely used. Therefore, the same members are represented by the same reference numerals, and different members will be mainly described below.

The image display system 50 shown in FIG. 4 includes a transparent screen 52 according to the embodiment of the present invention and the projector 54.

In addition, the transparent screen 52 includes a λ/4 plate 56, the right polarized light dot film 20, and the right polarized light reflecting layer film 26. In FIG. 4, an interface between the right polarized light dot film 20 and the right polarized light reflecting layer film 26 is indicated by a thick line. As in the case of the above-described example, although not shown in the drawing, the λ/4 plate 56 and the right polarized light dot film 20, and the right polarized light dot film 20 and a right polarized light film are bonded using bonding layers, respectively.

The λ/4 plate 56 converts linearly polarized light into right circularly polarized light. That is, the λ/4 plate 56 is disposed to align a slow axis such that the outgoing light is right circularly polarized light corresponding to the right polarized light dot film 20 and the right polarized light reflecting layer film 26.

The λ/4 plate (plate having a λ/4 function) is a plate having a function of converting linearly polarized light having a specific wavelength into circularly polarized light (or converting circularly polarized light into linearly polarized light). More specifically, the λ/4 plate is plate in which an in-plane retardation value at a specific wavelength λnm satisfies Re (λ)=λ/4 (or an odd number of times thereof). This expression only has to be satisfied at any wavelength (for example, 550 nm) in a visible range.

The λ/4 plate 56 may have a configuration in which only an optically-anisotoropic layer having a λ/4 function is formed or a configuration in which an optically-anisotoropic layer having a λ/4 function is formed on a support. In a case where the λ/4 plate 56 includes the support, a combination of the support and the optically-anisotropic layer is the λ/4 plate.

As the λ/4 plate 56, a well-known λ/4 plate can be used. Accordingly, the in-plane retardation value Re (550) at a wavelength of 550 nm is not particularly limited and is preferably 115 to 165 nm, more preferably 120 to 150 nm, and still more preferably 125 to 145 nm. Even in a case where the λ/4 plate 56 includes a layer other than the optically-anisotoropic layer, for example, the support, it is preferable that the in-plane retardation value of the λ/4 plate 56 is in the above-described range.

In addition, in the λ/4 plate 56 of the transparent screen 52 shown in the example of the drawing, it is preferable that a thickness-direction retardation Rth (550) is as low as possible.

Specifically, Rth (550) is preferably −50 to 50 nm and more preferably −30 to 30 nm, and it is still more preferably that Rth (λ) is zero.

As a result, the result that is preferable from the viewpoint of converting linearly polarized light which is obliquely incident on the λ/4 plate 56 into circularly polarized light can be obtained.

The right polarized light dot film 20 is the above-described right polarized light dot film 20 in which the red right circularly polarized light dot laminate 30rR including the support 32, the red right circularly polarized light reflecting dots 34rR, and the overcoat layer 36, the green right circularly polarized light dot laminate 30gR including the support 32, the green right circularly polarized light reflecting dots 34gR, and the overcoat layer 36, and the blue right circularly polarized light dot laminate 30bR including the support 32, the blue right circularly polarized light reflecting dots 34bR, and the overcoat layer 36 are laminated.

In addition, the right polarized light reflecting layer film 26 is the above-described right polarized light reflecting layer film 26 in which the support 40, the red right circularly polarized light reflecting layer 42rR, the green right circularly polarized light reflecting layer 42gR, and the blue right circularly polarized light reflecting layer 42bR are laminated.

Here, although described below, in a case where the transparent screen 52 includes only the right polarized light dot film 20 and the right polarized light reflecting layer film 26 that reflect right circularly polarized light, the λ/4 plate 56 is incorporated into the transparent screen, the projector 54 is a projector of which outgoing light is linearly polarized light, and right circularly polarized light obtained from the λ/4 plate 56 is incident on the right polarized light dot film 20 and is further incident on the right polarized light reflecting layer film 26.

Accordingly, in this case, in order to maintain polarization, in the support 32 of the right polarized light dot film 20 and the support 40 of the right polarized light reflecting layer film 26, it is preferable that Re (λ) and Rth (λ) are as low as possible.

Specifically, in the support 32 and the support 40, Re (550) is preferably 0 to 20 nm and more preferably 0 to 5 nm. In addition, in the support 32 and the support 40, Rth (550) is preferably 0 to 50 nm and more preferably 0 to 40 nm.

In a case where the transparent screen 52 includes only the right polarized light dot film 20 and the right polarized light reflecting layer film 26 that reflect right circularly polarized light, the projector 54 is a projector of which outgoing light is linearly polarized light.

In other words, in the present invention, in a case where the outgoing light of the projector is linearly polarized light, the transparent screen includes: an λ/4 plate that converts the outgoing light of the projector into circularly polarized light; and a dot film and a reflecting layer film that reflect right or left circularly polarized light.

In addition, in the present invention, in a case where the outgoing light of the projector is unpolarized light, the transparent screen does not include the λ/4 plate and preferably includes: a dot film that reflects right circularly polarized light; a dot film that reflects left circularly polarized light; a reflecting layer film that reflects right circularly polarized light; and a reflecting layer film that reflects left circularly polarized light.

In a case where the outgoing light is linearly polarized light, various well-known projectors such as a liquid crystal on silicon (LCOS) projector or a laser projector can be used as the projector 54.

Among these, a laser projector is preferably used due to the following reason.

Here, in a case where the projector 54 of which outgoing light is linearly polarized light is used, it is preferable that light incident from the projector 54 to the transparent screen 52 is a P-wave with respect to the transparent screen 52, and it is preferable that an incidence angle of light from the projector 54 to the transparent screen 52 is 56°±10° with respect to the normal line perpendicular to the transparent screen 52.

That is, in a case where the projector 54 of which outgoing light is linearly polarized light is used, it is preferable that light incident from the projector 54 to the transparent screen 52 is a P-wave with respect to the transparent screen 52, and it is preferable that an angle between an optical axis of the projector 54 and the normal line perpendicular to the transparent screen 52 is 56°±10°.

As described above, in the image display system including the transparent screen, a light source of the projector is observed through the transparent screen in a straight advancing direction of the outgoing light of the projector such that a hot spot occurs, and a light source of the projector is also indirectly observed at a position where the outgoing light of the projector is specularly reflected from the surface of the screen in a straight advancing direction of the outgoing light of the projector such that a hot spot occurs.

Here, as is well-known in the art, a reflectivity of linearly polarized light varies depending on an incidence angle of a reflecting surface. In the case of a P-wave with respect to the reflecting surface, in a case where light is incident at an angle of 56° with respect to a normal line perpendicular to the reflecting surface, a reflectivity of the light is substantially zero.

Accordingly, in a case where light incident from the projector 54 of which outgoing light is linearly polarized light to the transparent screen 52 is a P-wave with respect to the transparent screen 52, and in a case where the incidence angle of light from the projector 54, that is, the optical axis of the projector 54 is 56°±10° with respect to the normal line perpendicular to the transparent screen 52, a hot spot caused by specular reflection of light of the projector 54 from the transparent screen 52 can be significantly reduced.

As a method of converting linearly polarized light emitted from the projector 54 into a P-wave with respect to the transparent screen 52, various well-known methods such as a method of rotating the light source of the projector 54 around the optical axis can be used.

Hereinafter, the transparent screen 52 and the image display system 50 according to the embodiment of the present invention will be described in more detail by describing the action of the image display system 50.

First, linearly polarized light carrying an image that is emitted from the projector 54 is converted into right circularly polarized light by the λ/4 plate 56.

The right circularly polarized light obtained by the λ/4 plate 56 is incident on the right polarized light dot film 20.

First, the right circularly polarized light incident on the right polarized light dot film 20 is incident on the blue right circularly polarized light dot laminate 30*b*R. Next, as described above, only blue right circularly polarized light incident on the blue right circularly polarized light reflecting dots 34*b*R is reflected from the blue right circularly polarized light reflecting dots 34*b*R, and light other than the blue right circularly polarized light incident on the blue right circularly polarized light reflecting dots 34*b*R and light incident on portions other than the blue right circularly polarized light reflecting dots 34*b*R pass through the blue right circularly polarized light dot laminate 30*b*R.

Next, the light having passed through the blue right circularly polarized light dot laminate 30*b*R is incident on the green right circularly polarized light dot laminate 30*g*R.

In the light incident on the green right circularly polarized light dot laminate 30*g*R, similarly, only green right circularly polarized light incident on the green right circularly polarized light reflecting dots 34*g*R is reflected from the green right circularly polarized light reflecting dots 34*g*R, and light other than the green right circularly polarized light incident on the green right circularly polarized light reflecting dots 34*g*R and light incident on portions other than the green right circularly polarized light reflecting dots 34*g*R pass through the green right circularly polarized light dot laminate 30*g*R.

Next, the light having passed through the green right circularly polarized light dot laminate 30*g*R is incident on the red right circularly polarized light dot laminate 30*r*R.

In the light incident on the red right circularly polarized light dot laminate 30*r*R, similarly, only red right circularly polarized light incident on the red right circularly polarized light reflecting dots 34*r*R is reflected from the red right circularly polarized light reflecting dots 34*r*R, and light other than the red right circularly polarized light incident on the red right circularly polarized light reflecting dots 34*r*R and light incident on portions other than the red right circularly polarized light reflecting dots 34*r*R pass through the red right circularly polarized light dot laminate 30*r*R and pass through the right polarized light dot film 20.

As in the case of the above-described example, an image is displayed (projected) on the transparent screen 52 by the blue, green, red right circularly polarized light components reflected from the blue right circularly polarized light reflecting dots 34*b*R, the green right circularly polarized light reflecting dots 34*g*R, and the red right circularly polarized light reflecting dots 34*r*R.

Next, the right circularly polarized light having passed through the right polarized light dot film 20 (the red right circularly polarized light dot laminate 30*r*R) is incident on the right polarized light reflecting layer film 26.

First, the light incident on the right polarized light reflecting layer film 26 is incident on the blue right circularly polarized light reflecting layer 42*b*R, only blue right circularly polarized light is reflected, and the other light components pass through the blue right circularly polarized light reflecting layer 42*b*R.

Next, the light having passed through the blue right circularly polarized light reflecting layer 42*b*R is incident on the green right circularly polarized light reflecting layer 42*g*R, only green right circularly polarized light is reflected, and the other light components pass through the green right circularly polarized light reflecting layer 42*g*R.

Next, the light having passed through the green right circularly polarized light reflecting layer 42*g*R is incident on the red right circularly polarized light reflecting layer 42*r*R, only red right circularly polarized light is reflected, and the other light components pass through the red right circularly polarized light reflecting layer 42*r*R, that is, the right polarized light reflecting layer film 26.

As described above, in the image display system 50, the light incident from the projector 54 to the right polarized light dot film 20 is right circularly polarized light. In this example, right circularly polarized light that has passed through the right polarized light dot film 20 and is not used for display is reflected from the right polarized light reflecting layer film 26. Therefore, a hot spot can be significantly reduced. Further, as in the case of the above-described example, an image can be displayed at a wide viewing angle by light reflection having high diffusibility using the reflecting dots.

In addition, in the transparent screen 52, the number of films is less than that in the transparent screen 12 shown in FIG. 1. Therefore, the light-transmitting property can be further improved, and the haze can also be reduced.

As described above, in this example, the projector 54 of which outgoing light is polarized light is used. Here, in the image display system in which a laser projector is used as the projector 54, there may be a problem in that a phenomenon called speckle occurs, the speckle being a phenomenon in which laser beams are mutually intensified or weakened due to high coherence such that a large number of fine bright and dark spots are formed on a display image and flicker of a twinkling image occurs.

On the other hand, in the transparent screen according to the embodiment of the present invention, light carrying a display image is diffused by the reflecting dots with high diffusibility. Therefore, in a case where the laser projector is used, the occurrence of speckle can be suppressed.

In the image display system 50 shown in FIG. 4, in a case where a projector having a narrow wavelength range of outgoing light such as a laser projector is used as the projector 54, it is preferable that a liquid crystal compound having low $\Delta$n (low $\Delta$n liquid crystal (LC)) is used as liquid crystal constituting the cholesteric liquid crystalline phase for forming the reflecting dots of the right polarized light dot film 20 and the reflecting layers of the right polarized light reflecting layer film 26 such that the reflecting dots and the reflecting layers reflect only circularly polarized light in a narrow wavelength range corresponding to the wavelength range of the outgoing light of the laser projector.

With this configuration, the wavelength range of light that can pass through the right polarized light dot film 20 and the right polarized light reflecting layer film 26 can be widened, the transparency of the transparent screen can be further improved, and light in a wavelength range incident from the projector 54 to the reflecting dots can be reliably reflected. As a result, an appropriate image can be displayed.

Specifically, in a case where a laser projector is used as the projector, $\Delta$n of the liquid crystal compound constituting the reflecting dots and the reflecting layers is preferably 0.01 to 0.1 and more preferably 0.03 to 0.07.

In the transparent screen 52 shown in FIG. 4, the right polarized light dot film 20 and the right polarized light reflecting layer film 26 that reflect right circularly polarized light are used, and light is converted into right circularly polarized light by the $\lambda$/4 plate 56. However, the present invention is not limited to this configuration.

That is, even in a case where linearly polarized light is converted into left circularly polarized light by the $\lambda$/4 plate 56, the left polarized light dot film 24 that reflects left circularly polarized light is used instead of the right polarized light dot film 20, and the left polarized light reflecting layer film 28 that reflects left circularly polarized light is used instead of the right polarized light reflecting layer film 26, the same transparent screen and the same image display system can be configured.

In addition, in the image display system shown in the example of the drawing, linearly polarized light is made to be incident on the λ/4 plate 56 using the projector 54 of which outgoing light is polarized light. However, the present invention is not limited to this configuration.

For example, in the image display system according to the embodiment of the present invention including the dot film and the reflecting layer film that reflect only right circularly polarized light (or only left circularly polarized light), as in the case of the projector 14, a projector of which outgoing light is unpolarized light may be used, light emitted from the projector may be made to be incident on a linear polarizing plate to be converted into linearly polarized light, and the linearly polarized light obtained by the linear polarizing plate may be made to be incident on the λ/4 plate 56.

Figure 5:
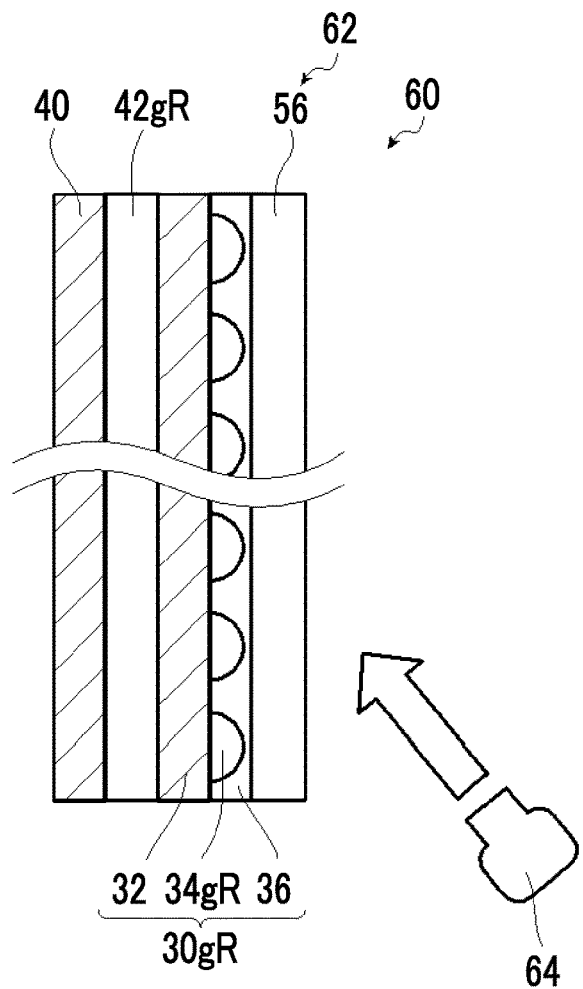
FIG. 5 is a diagram conceptually showing still another example of the image display system according to the embodiment of the present invention.

FIG. 5 conceptually shows still another example of the image display system according to the embodiment of the present invention including still another example of the transparent screen according to the embodiment of the present invention.

In an image display system 60 shown in FIG. 5, the same members as those of the image display system 10 shown in FIG. 1 are widely used. Therefore, the same members are represented by the same reference numerals, and different members will be mainly described below.

The image display system 60 shown in FIG. 5 includes a transparent screen 62 according to the embodiment of the present invention and a projector 64. The image display system 60 displays a monochromic image. In the example of the drawing, the image display system 60 displays an image having one color of green.

Accordingly, the projector 64 is a green monochrome projector.

In addition, the transparent screen 62 includes the λ/4 plate 56, the green right circularly polarized light dot laminate 30gR, the support 40, and the green right circularly polarized light reflecting layer 42gR. As in the case of the above-described example, although not shown in the drawing, the λ/4 plate 56 and the green right circularly polarized light dot laminate 30gR, and the green right circularly polarized light dot laminate 30gR and the green right circularly polarized light reflecting layer 42gR are bonded using bonding layers, respectively.

The λ/4 plate 56 is the same as described above.

As described above, the green right circularly polarized light dot laminate 30gR includes the support 32, the green right circularly polarized light reflecting dots 34gR, and the overcoat layer 36.

In addition, the support 40 and the green right circularly polarized light reflecting layer 42gR are also as described above.

The projector 64 has the same configuration as the projector 54 except that it is a monochrome projector, and various projectors of which outgoing light is linearly polarized light can be used.

Hereinafter, the transparent screen 62 and the image display system 60 according to the embodiment of the present invention will be described in more detail by describing the action of the image display system 60.

First, green linearly polarized light carrying an image that is emitted from the projector 64 is converted into right circularly polarized light by the λ/4 plate 56.

The green right circularly polarized light obtained by the λ/4 plate 56 is incident on the right polarized light dot film 20.

Next, the right circularly polarized light incident on the right polarized light dot film 20 is incident on the green right circularly polarized light dot laminate 30gR.

In the light incident on the green right circularly polarized light dot laminate 30gR, as described above, only green right circularly polarized light incident on the green right circularly polarized light reflecting dots 34gR is reflected from the green right circularly polarized light reflecting dots 34gR, and light other than the green right circularly polarized light incident on the green right circularly polarized light reflecting dots 34gR and light incident on portions other than the green right circularly polarized light reflecting dots 34gR pass through the green right circularly polarized light dot laminate 30gR.

As in the case of the above-described example, an image is displayed (projected) on the transparent screen 62 by the green right circularly polarized light reflected from the green right circularly polarized light reflecting dots 34gR.

The light having passed through the green right circularly polarized light dot laminate 30gR is incident on the green right circularly polarized light reflecting layer 42gR, only green right circularly polarized light is reflected, and the other light components pass through the green right circularly polarized light reflecting layer 42gR.

In this example, right circularly polarized light that has passed through the green right circularly polarized light dot laminate 30gR and is not used for display is reflected from the green right circularly polarized light reflecting layer 42gR. Therefore, a hot spot can be significantly reduced. Further, as in the case of the above-described example, an image can be displayed at a wide viewing angle by light reflection having high diffusibility using the reflecting dots.

In addition, in the transparent screen 62, the number of films (number of layers) is less than that in the transparent screen 52 shown in FIG. 5. Therefore, the light-transmitting property can be further improved, and the haze can also be reduced. Further, as described above, the occurrence of speckle in a case where a laser projector is used can also be used.

In the example shown in FIG. 5, right circularly polarized light is reflected using the green right circularly polarized light dot laminate 30gR and the green right circularly polarized light reflecting layer 42gR. However, linearly polarized light emitted from the projector 64 may be converted into left circularly polarized light by the λ/4 plate 56, and the left circularly polarized light may be reflected using the green left circularly polarized light dot laminate 30gL and the green left circularly polarized light reflecting layer 42gL.

In addition, the image display system 60 shown in FIG. 5 displays a green monochromic image. However, the present invention is not limited to this configuration and is applicable to display of monochromic images of various colors. For example, by using a projector that emits a blue monochromic image, using the blue right circularly polarized light dot laminate 30bR instead of the green right circularly polarized light dot laminate 30gR, and using the blue right circularly polarized light reflecting layer 42bR instead of the green right circularly polarized light reflecting layer 42gR, an image display system that displays a blue monochromic image may be configured.

The transparent screen according to the embodiment of the present invention is not limited to the configurations shown in FIGS. 1, 4, and 5. That is, the transparent screen according to the embodiment of the present invention is applicable to various configurations as long as it includes: a dot array in which dots obtained by immobilizing a cholesteric liquid crystalline phase are two-dimensionally arranged; and a uniform layer that is obtained by immobilizing a cholesteric liquid crystalline phase.

For example, the transparent screen corresponding to the display of a green monochromic image may be configured using only the green right circularly polarized light dot laminate 30gR and the green right circularly polarized light reflecting layer 42gR. Alternatively, in the transparent screen 52 shown in FIG. 4, the right polarized light film may be formed using only the support 40 and the green right circularly polarized light reflecting layer 42gR. With this configuration, green right circularly polarized light can be reflected from the green right circularly polarized light reflecting layer 42gR, and thus the effect of reducing a hot spot can be obtained.

In addition, in the transparent screen 12 shown in FIG. 1, the transparent screen may be configured using only the right polarized light dot film 20 and the left polarized light reflecting layer film 28. Alternatively, in the transparent screen 12 shown in FIG. 1, the transparent screen may be configured without providing the right polarized light reflecting layer film 26. With these configurations, left circularly polarized light can be reflected from the left polarized light reflecting layer film 28, and thus the effect of reducing a hot spot can also be obtained.

In addition, the present invention is not limited to the transparent screen corresponding to a full color image of red, green, and blue and the transparent screen corresponding to a monochromic image such as a green monochromic image.

For example, the transparent screen 52 shown in FIG. 4 may display an image using two colors of red and green in a configuration in which the right polarized light dot film 20 does not include the blue right circularly polarized light dot laminate 30bR and the right polarized light reflecting layer film 26 does not include the blue right circularly polarized light reflecting layer 42bR.

Further, in the example of the drawing, the dot array is configured by forming two-dimensionally the reflecting dots on the support 32. However, the present invention is not limited to this configuration.

For example, by two-dimensionally forming the reflecting dots on a surface of the layer such as the blue right circularly polarized light reflecting layer 42bR obtained by immobilizing a cholesteric liquid crystalline phase instead of forming the reflecting dots on the support 32, the dot array in which dots obtained by immobilizing a cholesteric liquid crystalline phase are two-dimensionally arranged may be formed.

Hereinabove, the transparent screen and the image display system according to the present invention have been described above. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

<Preparation of Underlayer>

Components shown below were stirred and dissolved in a container held at 25° C. to prepare an underlayer-forming solution.

(Underlayer-Forming Solution)

Mixture A of the following rod-shaped liquid crystal compounds: 100 parts by mass IRGACURE 819 (manufactured by BASF SE): 3 parts by mass The following compound A: 0.6 parts by mass Methyl ethyl ketone: 932.4 parts by mass Mixture A of the following rod-shaped liquid crystal compounds

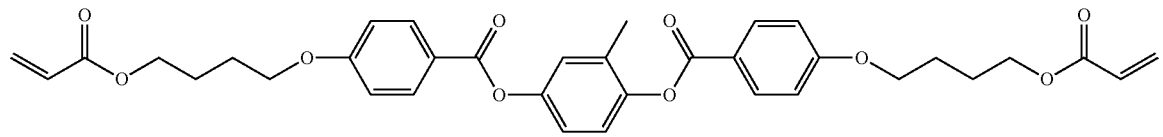

84%

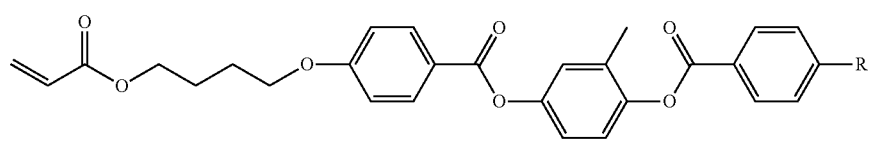

14%

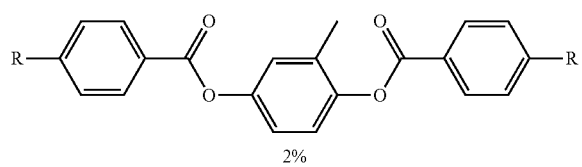

2%

-continued

R: 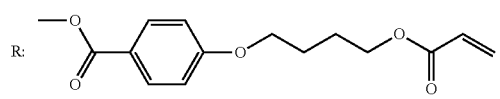

Numerical values are represented by mass %. In addition, R represents a group to be bonded to oxygen.

Compound A

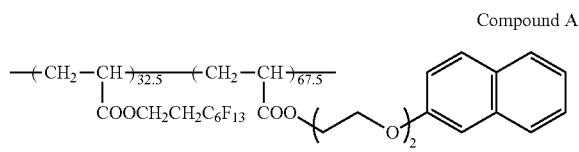

As the support 32, a transparent PET film (COSMOS-HINE A4100, manufactured by Toyobo Co., Ltd.) having a thickness of 75 μm that was rubbed in a longitudinal direction was prepared.

The prepared underlayer-forming solution was applied to the support 32 using a bar coater #2.6. Next, the coating film was heated such that the coating film surface temperature was 50° C., and then was dried for 60 seconds. Next, in a nitrogen purged atmosphere having an oxygen concentration of 100 ppm or lower, the coating film was irradiated with ultraviolet light at 500 mJ/cm$^2$ using an ultraviolet irradiation device to promote a crosslinking reaction. As a result, an underlayer was prepared.

The haze value of the support 32 on which the underlayer was formed was measured and was 0.8%.

<Formation of Cholesteric Liquid Crystal Dot>

Components shown below were stirred and dissolved in a container held at 25° C. to prepare a cholesteric liquid crystal ink solution gR (liquid crystal composition).

(Cholesteric Liquid Crystal Ink Solution gR)

Cyclopentanone: 139.6 parts by mass

Mixture A of the rod-shaped liquid crystal compounds: 100 parts by mass

IRGACURE 907 (manufactured by BASF SE): 3.0 parts by mass

KAYACURE DETX (manufactured by Nippon Kayaku Co., Ltd.): 1 part by mass

The following chiral agent A: 5.78 parts by mass

The following surfactant: 0.08 parts by mass of 550 nm. In addition, the cholesteric liquid crystal ink solution gR is a material for forming dots that reflect right circularly polarized light. That is, the cholesteric liquid crystal ink solution gR is a material for forming the green right circularly polarized light reflecting dots 34gR.

Using an ink jet printer (DMP-2831, manufactured by Fujifilm Dimatix Inc.) in which a platen was heated to 60° C., the prepared cholesteric liquid crystal ink solution gR was jetted to the entire 100×100 mm region of the underlayer of the support layer 32 on which the underlayer was formed such that the distance (pitch) between dot centers was 60 μm. The cholesteric liquid crystal ink solution gR was dried on the platen at 60° C. for 30 seconds or longer and then was irradiated with ultraviolet light at 500 mJ/cm$^2$ at room temperature using an ultraviolet irradiation device to be cured. As a result, the support 32 having a surface on which the green right circularly polarized light reflecting dots 34gR were formed was obtained.

<Dot Shape and Evaluation of Cholesteric Structure>

Among the prepared green right circularly polarized light reflecting dots 34gR, any 10 dots were selected, and the shapes of the dots were observed using a laser microscope (manufactured by Keyence Corporation). As a result, the average diameter of the dots was 30 μm, the average maximum height was 6 μm, an average angle (contact angle) at a contact portion between a dot surface of a dot end portion and an underlayer surface was 44°, and the height was continuously increased in a direction from the dot end portion to the center.

Regarding one green right circularly polarized light reflecting dot 34gR positioned at the center of the support 32, a surface including the dot center was cut in a direction perpendicular to the support 32, and the obtained cross-section was observed using a scanning electron microscope. As a result, a stripe pattern including bright portions and dark portions was observed in the dot as shown in FIGS. 2 and 3.

Further, in the cross-sectional view, as shown in FIG. 2, at a position where the angle $α_1$ was 30° and at a position

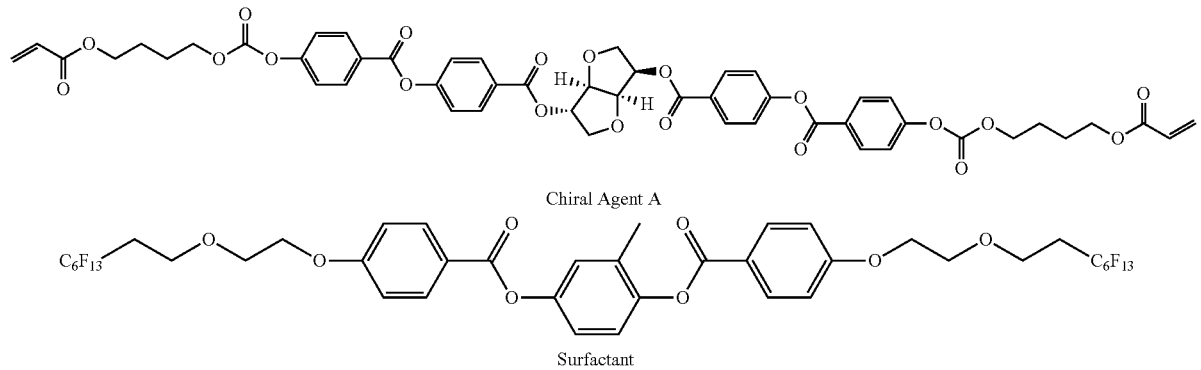

Chiral Agent A

Surfactant

Figure 8:
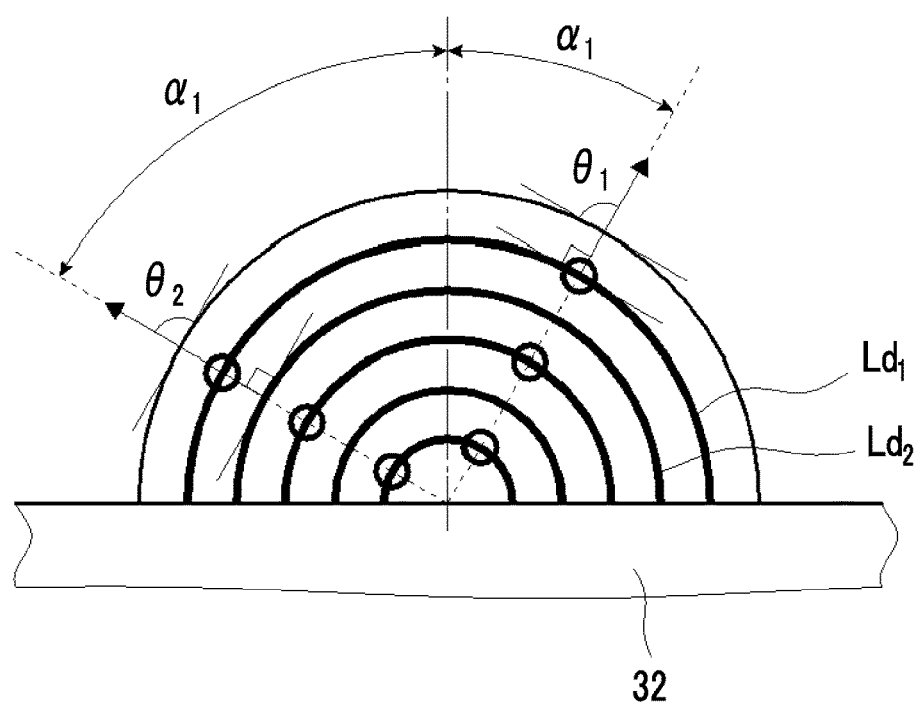
FIG. 8 is a conceptual diagram showing a measurement method in Examples of the present invention.

The cholesteric liquid crystal ink solution gR is a material for forming dots that reflect light having a center wavelength where the angle $α_1$ was 60°, the angles $θ_1$ and $θ_2$ between normal directions of lines, which were formed using dark portions of the dot, and the surface of the dot were measured, the angle α₁ being an angle with respect to a line (chain line) perpendicular to the surface of the support 32 passing through the center of the dot. As conceptually shown in FIG. 8, the measurement was on the lines which were formed using three dark portions including: a line which was formed using the outermost dark portion of the dot (the line Ld₁ (dot end portion) which was formed using the first dark portion in FIG. 2); a line (dot center) which was formed using the innermost dark portion of the dot; and a line (between the dot end portion and the center) which was formed using a dark portion between the dot end portion and the dot center.

As a result, the angles measured at the dot end portion, at the portion between the dot end portion and the dot center, at the dot center were 90°, 89°, and 90°, respectively. That is, in the dot, the angles between the normal directions of the lines, which were formed using the dark portions of the dot, and the surface of the dot were substantially the same even at the vicinity of the surface of the dot, at the center (innermost portion) of the dot, and at the intermediate portion of the dot.

<Dot Area Ratio>

Any five portions were selected from the support 32 on which the green right circularly polarized light reflecting dots 34gR were formed and were observed using a laser microscope (manufactured by Keyence Corporation) to measure area ratios of dots in a 1×1 mm region. As a result, the average value of the area ratios of the dots in the five portions was 20.2%.

<Formation of Overcoat Layer 36>

Components shown below were stirred and dissolved in a container held at 25° C. to prepare an overcoat layer-forming coating solution.

(Overcoat Layer-Forming Coating Solution)

Methyl ethyl ketone: 103.6 parts by mass

KAYARAD DPCA-30 (manufactured by Nippon Kayaku Co., Ltd.): 40 parts by mass

The following compound L: 60 parts by mass

The compound A: 0.6 parts by mass

IRGACURE 127 (manufactured by BASF SE): 3 parts by mass

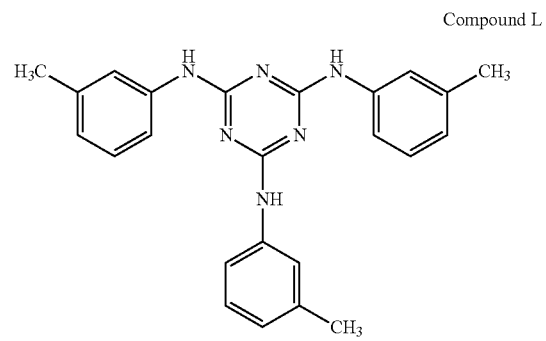

Compound L

The prepared overcoat layer-forming coating solution was applied to the support 32 (underlayer) on which the green right circularly polarized light reflecting dots 34gR were formed using a bar coater #8.

Next, the coating film was heated such that the coating film surface temperature was 50° C., and then was dried for 60 seconds. Next, the coating film was irradiated with ultraviolet light at 500 mJ/cm² using an ultraviolet irradiation device to promote a crosslinking reaction. As a result, the overcoat layer 36 was prepared, and the green right circularly polarized light dot laminate 34gR was obtained.

<Preparation of Cholesteric Liquid Crystal Ink Solution rR and Cholesteric Liquid Crystal Ink Solution bR>

A cholesteric liquid crystal ink solution rR was prepared under the same conditions as those of the cholesteric liquid crystal ink solution gR, except that the addition amount of the chiral agent A was changed to 4.7 parts by mass. In addition, a cholesteric liquid crystal ink solution bR was prepared under the same conditions as those of the cholesteric liquid crystal ink solution gR, except that the addition amount of the chiral agent A was changed to 7.02 parts by mass.

The cholesteric liquid crystal ink solution rR is a material for forming the red right circularly polarized light reflecting dots 34rR that reflect right circularly polarized light having a center wavelength of 650 nm. In addition, the cholesteric liquid crystal ink solution bR is a material for forming the blue right circularly polarized light reflecting dots 34bR that reflect right circularly polarized light having a center wavelength of 450 nm.

<Preparation of Cholesteric Liquid Crystal Ink Solution gL>

A cholesteric liquid crystal ink solution gL was prepared under the same conditions as those of the cholesteric liquid crystal ink solution gR, except that a chiral agent B was used instead of the chiral agent A and the addition amount of the chiral agent B was 8.09 parts by mass.

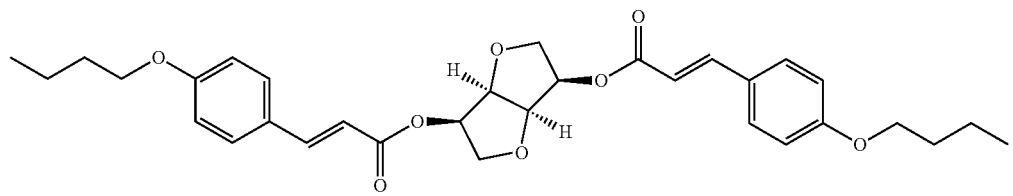

Chiral Agent B

The cholesteric liquid crystal ink solution gL is a material for forming the green left circularly polarized light reflecting dots 34gL that reflect left circularly polarized light having a center wavelength of 550 nm.

<Preparation of Cholesteric Liquid Crystal Ink Solution rL and Cholesteric Liquid Crystal Ink Solution bL>

A cholesteric liquid crystal ink solution rL was prepared under the same conditions as those of the cholesteric liquid crystal ink solution gL, except that the addition amount of the chiral agent B was changed to 6.98 parts by mass. In addition, a cholesteric liquid crystal ink solution bL was prepared under the same conditions as those of the cholesteric liquid crystal ink solution gL, except that the addition amount of the chiral agent B was changed to 9.62 parts by mass.

The cholesteric liquid crystal ink solution rL is a material for forming the red left circularly polarized light reflecting dots 34rL that reflect left circularly polarized light having a center wavelength of 650 nm. In addition, the cholesteric liquid crystal ink solution bL is a material for forming the blue left circularly polarized light reflecting dots 34bL that reflect left circularly polarized light having a center wavelength of 450 nm.

<Preparation of Dot Laminates>

The red right circularly polarized light dot laminate 30rR, the blue right circularly polarized light dot laminate 30bR, the green left circularly polarized light dot laminate 30gL, the red left circularly polarized light dot laminate 30rL, and the blue left circularly polarized light dot laminate 30bL were prepared under the same conditions as those of the green right circularly polarized light dot laminate 30gR, except that the prepared cholesteric liquid crystal ink solutions rR, bR, gL, rL, and bL were used instead of the cholesteric liquid crystal ink solution gR, respectively.

<Preparation of Optical Element for Right Polarized Light Reflecting Layer Film 26 and Left Polarized Light Reflecting Layer Film 28>

As the support 40, a transparent PET film (COSMOSHINE A4100, manufactured by Toyobo Co., Ltd.) having a thickness of 75 μm that was rubbed in a longitudinal direction was prepared.

The cholesteric liquid crystal ink solution rR was applied to the surface of the support 40 using a bar coater #8. Next, the coating film was heated such that the coating film surface temperature was 60° C., and then was dried for 120 seconds. Next, the coating film was irradiated with ultraviolet light at 500 mJ/cm$^2$ using an ultraviolet irradiation device to promote a crosslinking reaction. As a result, an optical element rR in which the red right circularly polarized light reflecting layer 42rR was formed on the surface of the support 40 was prepared.

Hereinafter, using the support 40 and the cholesteric liquid crystal ink solutions gR, bR, gL, rL, and bL, an optical element gR in which the green right circularly polarized light reflecting layer 42gR was formed on the surface of the support 40, an optical element bR in which the blue right circularly polarized light reflecting layer 42bR was formed on the surface of the support 40, an optical element rL in which the red left circularly polarized light reflecting layer 42rL was formed on the surface of the support 40, an optical element gL in which the green left circularly polarized light reflecting layer 42gL was formed on the surface of the support 40, and an optical element bL in which the blue left circularly polarized light reflecting layer 42bL was formed on the surface of the support 40 were prepared under the same conditions as described above.

<Preparation of Transparent Screen>

By bonding the prepared dot laminates and the prepared optical elements using a pressure sensitive adhesive (SK DINE, manufactured by Soken Chemical&Engineering Co., Ltd.), a transparent screen shown in FIG. 1 including the left polarized light reflecting layer film 28, the right polarized light reflecting layer film 26, the left polarized light dot film 24, and the right polarized light dot film 20 was prepared.

The lamination order was the optical element rL, the optical element gL, the optical element bL, the optical element rR, the optical element gR, the optical element bR, the red left circularly polarized light dot laminate 30rL, the green left circularly polarized light dot laminate 30gL, the blue left circularly polarized light dot laminate 30bL, the red right circularly polarized light dot laminate 30rR, the green right circularly polarized light dot laminate 30gR, and the blue right circularly polarized light dot laminate 30bR. In addition, the dot laminates were laminated such that the dots were present on the surface opposite to the optical element.

Comparative Example 1

A transparent screen was prepared under the same conditions as in Example 1, except that the optical element rL, the optical element gL, the optical element bL, the optical element rR, the optical element gR, and the optical element bR were not used.

That is, the transparent screen includes only the right polarized light dot film 20 and the left polarized light dot film 24 without including the right polarized light film 23 and the left polarized light reflecting layer film 28.

[Evaluation]

<Projector and Disposition>

Using PJWX4141 (manufactured by Ricoh Japan Corporation) as a projector, an image was projected from below the transparent screen such that a white image having a size of 5 cm×5 cm was displayed at the center of the prepared transparent screen.

This projector was a DLP projector, and outgoing light thereof was unpolarized light.

<Evaluation of Hot Spot (Straight Advancing Transmitted Light)>

Figure 6:
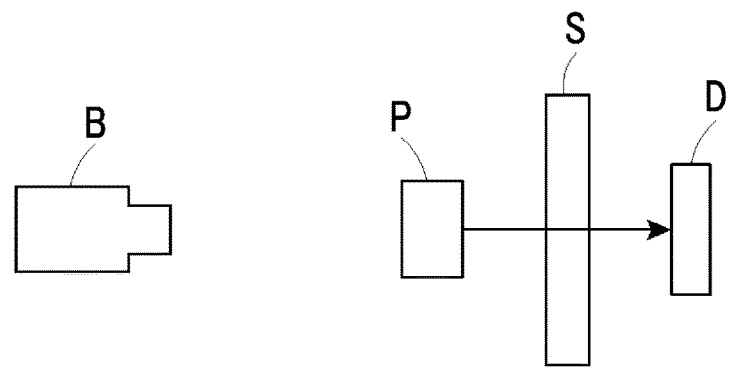
FIG. 6 is a conceptual diagram showing an evaluation method in Examples of the present invention.
Figure 7:
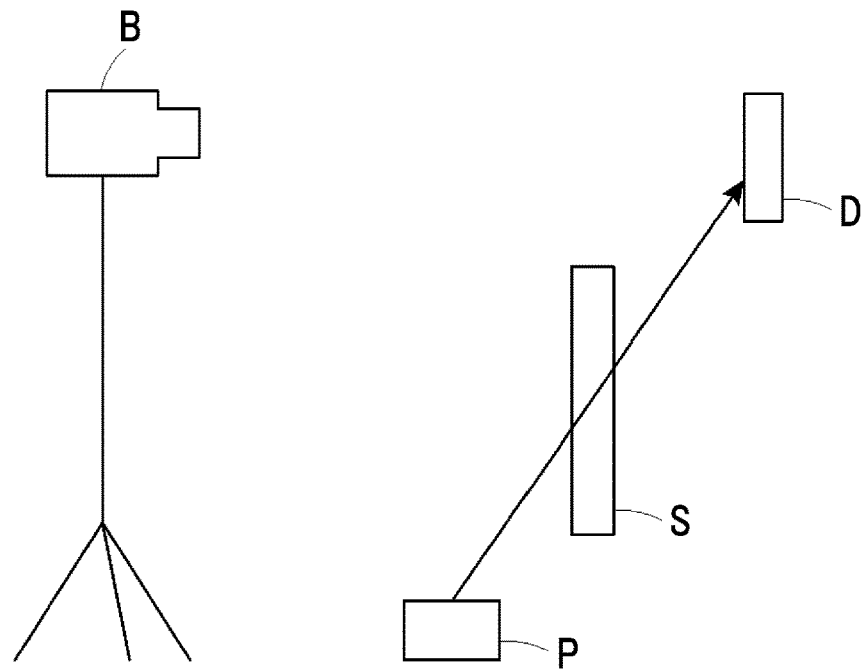
FIG. 7 is a conceptual diagram showing the evaluation method in Examples of the present invention.

As shown in FIGS. 6 and 7, a perfect diffusion plate D formed of barium sulfate was disposed on an extended line of the outgoing light of a projector P and the center of a transparent screen S, and the luminance was measured from a normal direction perpendicular to the perfect diffusion plate D using a luminance colorimeter B (BM-5, manufactured by Topcon Technohouse Corporation).

FIG. 6 is a top view, and FIG. 7 is a side view.

In a case where the luminance measurement result of the transparent screen according to Comparative Example 1 was normalized as 100, it was found that the luminance measurement result of the transparent screen according to Example 1 was 10 and a hot spot was significantly suppressed.

Example 2

<Preparation of Protective Film 01>

A cellulose acetate film was prepared with reference to Examples (paragraphs "0267" to "0270") described in JP2012-018396A. This cellulose acetate film was set as a protective film 01.

<Preparation of Aligned Film>

28 mL/m$^2$ of an aligned film-forming coating solution #16 having the following composition was applied to a surface of the protective film 01 using a wire bar coater #16. Next, the coating film was dried with warm air at 60° C. for 60 seconds and dried with warm air at 90° C. for 150 seconds. The surface of the formed film was rubbed with a rubbing roll while rotating the film in a direction parallel to a transport direction at 1000 rpm. As a result, the protective film 01 with the aligned film was prepared.

Aligned Film-Forming Coating Solution)

The following modified polyvinyl alcohol: 10 parts by mass

Water: 370 parts by mass
Methanol: 120 parts by mass
Glutaraldehyde (crosslinking agent): 0.5 parts by mass

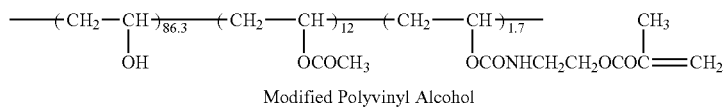

Modified Polyvinyl Alcohol

<Preparation of λ/4 Plate 56>

A λ/4 plate 56 was prepared by forming an optically-anisotoropic layer on the protective film 01 with the aligned film with reference to Examples (paragraphs "0272" to "0282") described in JP2012-018396A. Re (550) and Rth (550) were 138 nm and 5 nm, respectively.

<Preparation of Dot Laminates>

The red right circularly polarized light dot laminate 30rR, the green right circularly polarized light dot laminate 30gR, and the blue right circularly polarized light dot laminate 30bR were prepared under the same conditions as in Example 1, except that the protective film 01 with the aligned film was used as the support 32 instead of the PET film on which the underlayer was formed.

<Preparation of Optical Element for Right Polarized Light Film>

Optical elements rR, gR, and bR were prepared under the same conditions as in Example 1, except that the protective film 01 with the aligned film was used as the support 40 instead of the PET film that was rubbed in the longitudinal direction.

<Preparation of Transparent Screen>

By bonding the prepared λ/4 plate, the prepared reflecting dot laminates, and the prepared optical elements using a pressure sensitive adhesive (SK DINE, manufactured by Soken Chemical&Engineering Co., Ltd.), a transparent screen shown in FIG. 4 including the right polarized light dot film 26 and the right polarized light reflecting layer film 20 was prepared.

The lamination order was the optical element rR, the optical element gR, the optical element bR, the red right circularly polarized light dot laminate 30rR, the green right circularly polarized light dot laminate 30gR, the blue right circularly polarized light dot laminate 30bR, and the λ/4 plate 56. In addition, the dot laminates were laminated such that the dots were present on the surface opposite to the optical element.

Comparative Example 2

A transparent screen was prepared under the same conditions as in Example 2, except that the optical element rR, the optical element gR, and the optical element bR were not used.

That is, the transparent screen includes only the λ/4 plate 56 and the right polarized light dot film 20 without including the right polarized light reflecting layer film 26.

[Evaluation]

<Projector and Disposition>

Using LSPX-P1 (manufactured by Sony Corporation) as a projector, an image was projected from below the transparent screen such that a white image having a size of 5 cm×5 cm was displayed at the center of the transparent screen.

This projector was a laser projector, and outgoing light thereof was linearly polarized light.

<Evaluation of Hot Spot (Straight Advancing Transmitted Light)>

Under the same conditions as in Example 1 and Comparative Example 1, the luminance was measured using the luminance colorimeter B as shown in FIGS. 6 and 7.

In a case where the luminance measurement result of the transparent screen according to Comparative Example 2 was normalized as 100, it was found that the luminance measurement result of the transparent screen according to Example 2 was 7 and a hot spot was significantly suppressed.

As can be seen from the above results, the effects of the present invention are obvious.

EXPLANATION OF REFERENCES 10, 50, 60: image display system
12, 52, 62, S: transparent screen
14, 54, 64, P: projector
20: right polarized light dot film
24: left polarized light dot film
26: right polarized light film
28: left polarized light
30rR: red right circularly polarized light dot laminate
30gR: green right circularly polarized light dot laminate
30bR: blue right circularly polarized light dot laminate
30rL: red left circularly polarized light dot laminate
30gL: green left circularly polarized light dot laminate
30bL: blue left circularly polarized light dot laminate
32, 40: support
34rR: red right circularly polarized light reflecting dot
34gR: green right circularly polarized light reflecting dot
34bR: blue right circularly polarized light reflecting dot
34rL: red left circularly polarized light reflecting dot
34gL: green left circularly polarized light reflecting dot
34bL: blue left circularly polarized light reflecting dot
36: overcoat layer
42rR: red right circularly polarized light reflecting layer
42gR: green right circularly polarized light reflecting layer
42bR: blue right circularly polarized light reflecting layer
42rL: red left circularly polarized light reflecting layer
42gL: green left circularly polarized light reflecting layer
42bL: blue left circularly polarized light reflecting layer
B: luminance colorimeter
D: perfect diffusion plate

What is claimed is:

1. A transparent screen comprising:
a dot array in which dots obtained by immobilizing a cholesteric liquid crystalline phase are two-dimensionally arranged; and
a layer that is obtained by immobilizing a cholesteric liquid crystalline phase,
wherein a plurality of the dot arrays are provided,
selective reflection wavelengths of the dot arrays are different from each other,
a plurality of the layers are provided, and
selective reflection wavelengths of the layers are different from each other.

2. The transparent screen according to claim 1,
wherein a selective reflection wavelength of the dots is equal to a selective reflection wavelength of the layer.

3. The transparent screen according to claim 1,
wherein a rotation direction of circularly polarized light reflected form the dots is the same as a rotation direction of circularly polarized light reflected from the layer.

4. The transparent screen according to claim 1,
wherein the dot arrays include a dot array that reflects red light, a dot array that reflects green light, and a dot array that reflects blue light, and
the layers include a layer that reflects red light, a layer that reflects green light, and a layer that reflects blue light.

5. The transparent screen according to claim 1,
wherein dot arrays include the dot array that reflects right circularly polarized light and the dot array that reflects left circularly polarized light, and
layers include the layer that reflects right circularly polarized light and the layer that reflects left circularly polarized light.

6. The transparent screen according to claim 1, further comprising:
a λ/4 plate.

7. An image display system comprising:
the transparent screen according to claim 1; and
a projector of which outgoing light is unpolarized light.

8. An image display system comprising:
the transparent screen according to claim 6; and
a projector of which outgoing light is linearly polarized light.

9. The image display system according to claim 7,
wherein the dot array is positioned between the layer and the projector; and
in the dot array, convex portions of the dots fact the projector.

* * * * *